US010351291B2

(12) United States Patent
Carman

(10) Patent No.: US 10,351,291 B2
(45) Date of Patent: *Jul. 16, 2019

(54) REUSABLE PRODUCE CONTAINERS AND RELATED METHODS

(71) Applicant: Inteplast Group Corporation, Livingston, NJ (US)

(72) Inventor: Gregory A. Carman, Victoria, TX (US)

(73) Assignee: Inteplast Group Corporation, Livingston, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/712,013

(22) Filed: Sep. 21, 2017

(65) Prior Publication Data

US 2018/0009564 A1 Jan. 11, 2018

Related U.S. Application Data

(63) Continuation-in-part of application No. 15/387,386, filed on Dec. 21, 2016, which is a continuation of
(Continued)

(51) Int. Cl.
*B65D 5/10* (2006.01)
*B65D 5/22* (2006.01)
(Continued)

(52) U.S. Cl.
CPC ............. *B65D 5/103* (2013.01); *B65D 5/003* (2013.01); *B65D 5/0015* (2013.01); *B65D 5/22* (2013.01);
(Continued)

(58) Field of Classification Search
CPC ....... B65D 5/103; B65D 5/003; B65D 5/4295
(Continued)

(56) References Cited

U.S. PATENT DOCUMENTS 2,721,689 A * 10/1955 Nye ....................... B65D 5/001
206/392
2,844,294 A * 7/1958 Williams ............. B65D 5/2066
229/120.03
(Continued)

FOREIGN PATENT DOCUMENTS

CN 101160241 4/2008

OTHER PUBLICATIONS

U.S. Appl. No. 15/169,360, Office Action dated Jan. 5, 2018, 8 pgs.
(Continued)

*Primary Examiner* — Christopher R Demeree
(74) *Attorney, Agent, or Firm* — Matthew D. Thayne; Thayne and Davis LLC

(57) ABSTRACT

Embodiments of foldable containers, such as foldable produce containers, and related sheets and methods. In some embodiments, a sheet may comprise at least two adjacent, parallel, side panels, one of which may comprise a bendable tab, and the other of which may comprise a cutout configured to receive the bendable tab. This may allow for temporarily maintaining the two panels in position during a folding process to facilitate additional folding steps during the process. In some embodiments, a container may comprise one or more strapping flaps configured to facilitate tensioning of strapping material for strapping together multiple containers. These strapping flaps may be configured to engage a strapping material and may allow a single person to more easily tension the strapping material to strap multiple containers together.

22 Claims, 17 Drawing Sheets

Related U.S. Application Data application No. 14/726,201, filed on May 29, 2015, now Pat. No. 9,527,622.

(51) Int. Cl.
*B65D 5/00* (2006.01)
*B65D 5/42* (2006.01)
*B65D 85/34* (2006.01)

(52) U.S. Cl.
CPC ........... *B65D 5/427* (2013.01); *B65D 5/4295* (2013.01); *B65D 85/34* (2013.01); *Y02W 30/807* (2015.05)

(58) Field of Classification Search
USPC .......... 229/143, 178, 915, 919, 120, 122.32, 229/148, 127
See application file for complete search history.

(56) References Cited

U.S. PATENT DOCUMENTS

| | | | |
|---|---|---|---|
| 3,973,723 A | | 8/1976 | Owens |
| 4,082,215 A | | 4/1978 | Eichenauer |
| 4,134,533 A | | 1/1979 | Heavner |
| 4,158,410 A | * | 6/1979 | Novatny ................. B65D 5/50 206/451 |
| 4,236,740 A | * | 12/1980 | Sorenson ................. B65D 5/22 229/143 |
| 4,245,773 A | | 1/1981 | Stollberg |
| 4,301,922 A | * | 11/1981 | Hamelin ................. B65D 5/46 206/428 |
| 4,347,968 A | | 9/1982 | Cornell et al. |
| 4,883,221 A | * | 11/1989 | Brundage ............ B65D 5/0045 229/143 |
| 5,141,149 A | * | 8/1992 | Fulton .................... B65D 5/003 206/423 |
| 5,458,283 A | * | 10/1995 | Southwell ............ B65D 5/0025 229/178 |
| 5,649,663 A | | 7/1997 | Pestow, Jr. |
| 6,138,904 A | | 10/2000 | Baird et al. |
| 6,158,652 A | | 12/2000 | Ruiz et al. |
| 6,176,419 B1 | | 1/2001 | Holley, Jr. |
| D447,938 S | | 9/2001 | Tsuruishi |
| 6,899,266 B2 | * | 5/2005 | Conway ................ B65D 5/0025 229/169 |
| 7,207,473 B2 | | 4/2007 | Fry |
| 7,374,076 B2 | | 5/2008 | Holley |
| 8,136,717 B2 | | 3/2012 | De Paula |
| 8,827,142 B2 | | 9/2014 | Smith |
| 9,469,078 B2 | | 10/2016 | Aganovic |
| 9,475,606 B2 | | 10/2016 | Ball |
| 9,493,268 B2 | | 11/2016 | Loftin |
| D773,294 S | | 12/2016 | Choi |
| 9,527,622 B2 | | 12/2016 | Carman |
| D786,063 S | | 5/2017 | Choi |
| 2006/0157546 A1 | | 7/2006 | Holley |
| 2009/0277954 A1 | | 11/2009 | De Paula |
| 2010/0219232 A1 | | 9/2010 | Smith |
| 2015/0246745 A1 | | 9/2015 | Loftin |
| 2015/0251797 A1 | * | 9/2015 | Carman ............... B65D 5/0254 229/148 |
| 2016/0347496 A1 | | 12/2016 | Carman |
| 2017/0101212 A1 | | 4/2017 | Carman |

OTHER PUBLICATIONS

U.S. Appl. No. 15/387,386, Office Action dated Dec. 22, 2017, 8 pgs.
Concise Explanation of Relevance of CN 101160241.
U.S. Appl. No. 15/169,360, Office Action dated Aug. 3, 2017, 7 pgs.

\* cited by examiner

REUSABLE PRODUCE CONTAINERS AND RELATED METHODS

RELATED APPLICATIONS

This application is a continuation-in-part of co-pending U.S. patent application Ser. No. 15/387,386, which was filed on Dec. 21, 2016 and titled "REUSABLE PRODUCE CONTAINERS AND RELATED METHODS," which is a continuation of U.S. Pat. No. 9,527,622, which was filed on May 29, 2015 and is also titled "REUSABLE PRODUCE CONTAINERS AND RELATED METHODS," both of which are hereby incorporated by reference herein in their entireties.

SUMMARY

Embodiments of sheets configured to be assembled into foldable containers, such as foldable, plastic, produce containers, are disclosed herein, along with implementations of related methods. Finished containers are also described herein. In some embodiments, such sheets/containers may comprise a plastic, such as a corrugated plastic, and may be configured to be sufficiently sturdy to withstand multiple uses. Some embodiments may even allow for disassembly and reassembly where needed.

In a more specific example of an embodiment of a substantially planar sheet for folding into a container, the container may comprise a first locking tab positioned on a first panel of the sheet and a second locking tab positioned on a second panel of the sheet. The first panel may be configured to be folded with respect to the second panel during a folding process for folding the sheet into a three-dimensional container. The second locking tab may be configured to be positioned adjacent to the first locking tab after at least one folding step in which the first panel is folded relative to the second panel.

Some embodiments may further comprise a first locking flap positioned on a third panel of the sheet, wherein the third panel is configured to be folded with respect to the first and second panels during the folding process. The first locking flap may comprise a slot configured to receive the first locking tab and the second locking tab to secure the first panel, the second panel, and the third panel in place to at least partially define the three-dimensional container after the folding process.

In some embodiments, the first locking flap may comprise a door configured to open to expose the slot for receiving the first locking tab and the second locking tab upon bending the first locking flap with respect to the third panel. In some embodiments, the sheet may be configured such that, upon folding the third panel with respect to the first and second panels during the folding process, at least one of the first locking tab and the second locking tab automatically engages the door to cause the third locking flap to bend and expose the slot.

Some embodiments may comprise additional locking tabs and/or panels. For example, some embodiments may comprise a third locking tab positioned on a fourth panel of the sheet, wherein the fourth panel is configured to be folded with respect to the first, second, and third panels during the folding process, wherein the third locking tab is configured to be received in the slot along with the first locking tab and the second locking tab.

Similarly, some embodiments may comprise a third locking tab, wherein the third locking tab extends beyond a peripheral edge of the first panel for receipt in a second slot positioned within a third panel of the sheet.

In some embodiments, the first locking tab may be positioned within a clearance aperture such that the clearance aperture provides spacing between the first locking tab and a peripheral portion of the first panel.

Some embodiments may further comprise a third locking tab positioned on the first panel, wherein the third locking tab extends beyond a peripheral edge of the first panel and a second slot positioned on a third panel of the sheet. In some such embodiments, the first panel may comprise a rollover flap, wherein the first locking tab is positioned within the rollover flap, and wherein the first locking tab is configured to be received in the second slot after the rollover flap is folded over against the first panel to expose the first locking tab.

In some embodiments, the sheet may be configured to be folded into a three-dimensional container without the use of any adhesives or other bonding techniques.

In another specific example of a substantially planar sheet for folding into a container, the sheet may comprise a first panel comprising a rollover flap. The rollover flap may comprise a clearance aperture. A first locking tab may be positioned on the rollover flap and may extend beyond a peripheral edge of the first panel. The sheet may further comprise a second locking tab positioned within the clearance aperture such that the clearance aperture provides spacing between the second locking tab and the rollover flap. The sheet may further comprise a second panel comprising a slot for receiving the first locking tab, wherein the first locking tab is configured to be received in the slot after the rollover flap is folded over against the first panel to expose the second locking tab.

Some embodiments may further comprise a third panel comprising third locking tab and a fourth panel comprising a first locking flap. The fourth panel may be configured to be folded with respect to the first and third panels during a folding process for folding the sheet into a three-dimensional container. The first locking flap may comprise a second slot configured to receive the second locking tab and the third locking tab to secure the first panel, the third panel, and the fourth panel in place to at least partially define the three-dimensional container after the folding process.

In some embodiments, the clearance aperture may define a clearance distance between the second locking tab and the rollover flap at least as great as a distance with which the first locking tab extends beyond the peripheral edge of the first panel such that the rollover flap can be folded over with the third locking tab within the clearance aperture and such that the third locking tab can slide laterally within the clearance aperture and adjacent to the second locking tab by a distance at least as great as the distance with which the first locking tab extends beyond the peripheral edge of the first panel.

In some embodiments, the sheet, or at least one or more panels of the sheet, may comprise corrugated flutes. In some such embodiments, the first locking tab may comprise corrugated flutes that extend in a first direction, the second panel may comprise corrugated flutes defining the slot that extend in a second direction at an angle with respect to the first direction. In some embodiments, the second direction may be at least substantially perpendicular to the first direction.

In some embodiments, the first locking tab may extend in a direction at least substantially perpendicular to a direction in which the second locking tab extends.

In a specific example of a container according to some embodiments, the container may comprise a first side panel comprising a first locking tab and a second side panel positioned adjacent and at least substantially parallel to the first side panel. The second side panel may comprise a second locking tab. Some embodiments may further comprise a first top panel comprising a slot for receiving the first locking tab and the second locking tab with the first locking tab adjacent and at least substantially parallel to the second locking tab. The first top panel may further comprise a first locking flap configured to extend adjacent to an exterior surface of the container at least substantially parallel to the first locking tab and second locking tab to secure the first top panel in a closed position to at least partially enclose the container.

In some embodiments, the first locking tab may comprise a shape that is at least substantially identical to a shape of the second locking tab.

In some embodiments, the first side panel may further comprise a rollover flap configured to be folded with respect to the first side panel to expose the first locking tab.

In some embodiments, the first side panel may further comprise a clearance aperture. The first locking tab may be positioned within the clearance aperture such that the clearance aperture provides spacing between the first locking tab and the rollover flap.

In some embodiments, the first side panel further comprises a third locking tab extending beyond a peripheral edge of the first side panel. In some such embodiments, the third locking tab may be positioned on the rollover flap.

In another example of a sheet for folding into a container according to other embodiments, the sheet may comprise a first side panel comprising a first locking tab and a rollover flap configured to be folded with respect to the first side panel to expose the first locking tab. The sheet may further comprise a second side panel configured to be folded with respect to the first side panel during a folding process for folding the sheet into a three-dimensional container such that the second side panel is positioned adjacent and at least substantially parallel to the first side panel. The sheet may further comprise a third side panel configured to be folded with respect to the first side panel and the second side panel during the folding process such that the third side panel is positioned adjacent and at least substantially parallel to and overlaps with the second side panel. At least one of the second side panel and the third side panel may comprise a bendable tab, and at least one of the second side panel and the third side panel may comprise a cutout configured to receive the bendable tab to hold the second side panel in place with respect to the third side panel while the rollover flap is folded with respect to the first side panel to expose the first locking tab.

Some embodiments may further comprise a first top panel comprising a slot for receiving the first locking tab. The first top panel may further comprise a first locking flap configured to be folded so as to extend adjacent to an exterior surface of the container at least substantially parallel to the first locking tab to secure the first top panel in a closed position to at least partially enclose the container.

In some embodiments, the bendable tab may have a shape that at least substantially matches a shape of the cutout. In some embodiments, the shape may be trapezoidal, or at least substantially trapezoidal. In some embodiments, the bendable tab may be slightly larger in size than the cutout.

In some embodiments, the first locking flap may comprise a door configured to open to expose the slot for receiving the first locking tab upon bending the first locking flap with respect to the second and third side panels. In some such embodiments, the sheet may be configured such that, upon folding the first top panel with respect to the second and third side panels during the folding process, the first locking tab automatically engages the door to cause the first locking flap to bend and expose the slot.

In some embodiments, the first side panel may further comprise a clearance aperture. The first locking tab may be positioned to extend within the clearance aperture such that the clearance aperture provides spacing between the first locking tab and the rollover flap.

In another example of a container according to some embodiments, the container may comprise a first side panel defining an outermost surface of a first sidewall of the container; a second side panel adjacent to and at least substantially parallel to the first side panel, wherein the second side panel partially defines the first sidewall, and wherein second side panel is positioned interior of the first side panel; and a third side panel positioned adjacent and at least substantially parallel to the second side panel, wherein the third side panel partially defines the first sidewall, wherein the third side panel is positioned interior of the second side panel, wherein at least one of the second side panel and the third side panel comprises a bendable tab, and wherein at least one of the second side panel and the third side panel comprises a cutout configured to receive the bendable tab.

In some embodiments, the second side panel and the third side panel may each comprise a locking tab, wherein the respective locking tabs of the second side panel and the third side panel overlap.

Some embodiments may further comprise a first top panel, wherein the first top panel comprises a slot configured to receive both of the respective locking tabs of the second side panel and the third side panel.

In some embodiments, the first sidewall may comprise a width extending from a first end of the first sidewall to a second end of the first sidewall, wherein the first side panel extends along the entire width, wherein the second side panel extends from the first end without extending to the second end, and wherein the third side panel extends from the second end without extending to the first end.

In some embodiments, one or more of the sidewalls of the container may comprise means for holding strapping material while tensioning the strapping material for strapping together multiple containers, such as a bendable strapping flap configured to be selectively extended from the container so as to engage a strapping material. In some such embodiments, each of at least two opposing sidewalls of the container may comprise means for holding strapping material while tensioning the strapping material for strapping together multiple containers. In some such embodiments, each of the sidewalls of the container may comprise means for holding strapping material while tensioning the strapping material for strapping together multiple containers.

In another example of a container according to other embodiments, the container may comprise a first sidewall; a second sidewall positioned opposite the first sidewall; a third sidewall positioned adjacent to the first sidewall and the second sidewall; and a fourth sidewall positioned opposite the third sidewall. One or more of the sidewalls may comprise a strapping flap configured to facilitate tensioning of strapping material for strapping together multiple containers. The strapping flap(s) may be configured to be selectively extended from the container so as to engage a strapping material extending along the one or more sidewalls.

In some embodiments, the container may comprise a plurality of ventilation openings. In some such embodiments, the strapping flap may be formed so as to be adjacent to and/or partially define at least one of the plurality of ventilation openings extending through at least one of the sidewalls.

The features, structures, steps, or characteristics disclosed herein in connection with one embodiment may be combined in any suitable manner in one or more alternative embodiments.

BRIEF DESCRIPTION OF THE DRAWINGS

The written disclosure herein describes illustrative embodiments that are non-limiting and non-exhaustive. Reference is made to certain of such illustrative embodiments that are depicted in the figures, in which.

DETAILED DESCRIPTION

Consistent with embodiments disclosed herein, foldable containers, such as reusable containers, may be utilized to store produce. In some embodiments, such containers may comprise corrugated plastic containers. For example, in certain embodiments, the plastic containers disclosed herein may be configured to store and/or transport corn. Utilizing plastic containers offers certain benefits over conventional wood crates, wire crates, and/or wax-coated corrugated cardboard storage containers to store corn. For example, corrugated plastic containers configured to store corn consistent with embodiments disclosed herein may be reusable, may be assembled more quickly, may be generally lighter, may be less prone to causing injuries, may be generally more durable (especially through demanding harvesting, packing, post-harvest cooling, and shipping processes), may be may be recyclable or otherwise more sustainable, may resist mold growth, may provide certain container labeling and/or marking benefits, may be assembled/folded without requiring the use of additional adhesives or mechanical fastening, and/or may provide an improved sterile environment for packing fresh produce. Various additional features and benefits may be provided in connection with particular embodiments, as discussed in detail below.

Figure 1:
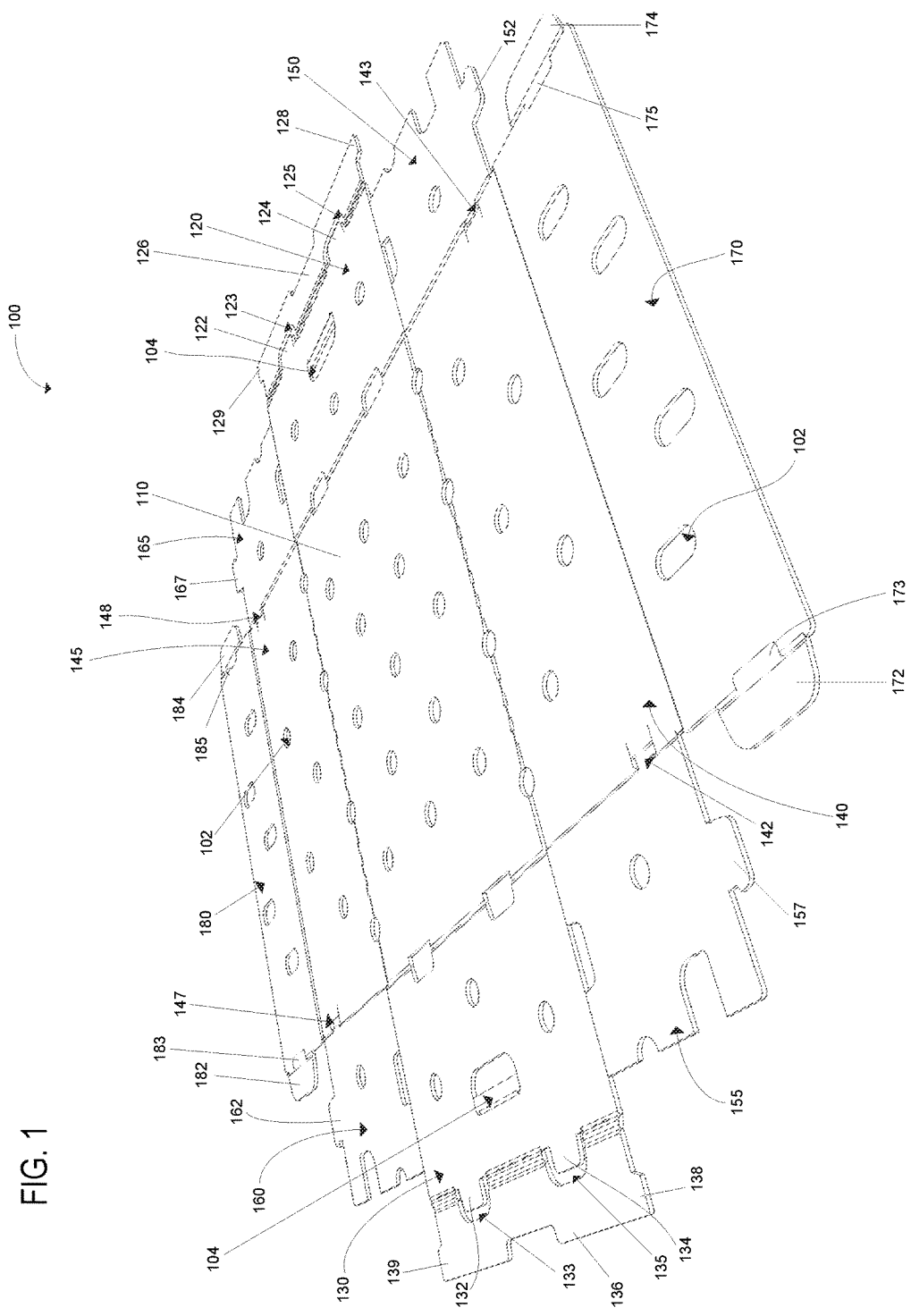
FIG. 1 illustrates a sheet configured for folding into a container consistent with some embodiments.

FIG. 1 illustrates a sheet 100 consistent with embodiments of the present disclosure. Sheet 100 comprises a substantially planar sheet that may be folded into a three-dimensional container. In some embodiments, sheet 100 may comprise a plastic. In some such embodiments, sheet 100 may comprise a corrugated plastic, such as a plastic made up of corrugated flutes.

Sheet 100 comprises a plurality of panels configured to be folded with respect to one another during a folding/assembly process. More particularly, sheet 100 comprises a first panel 110 that, when folded/assembled, will become a bottom to a container. Similarly, sheet 100 comprises a second panel 120 configured to serve as a side wall of the container, a third panel 130 configured to serve as another side wall of the container opposite from second panel 120, a fourth panel 140 configured to serve as another side wall of the container perpendicular to the side walls formed by second panel 120 and third panel 130, and a fifth panel 145 configured to serve as another side wall of the container opposite from that formed by fourth panel 140. One or more vent openings 102 may be formed in one or more of the various panels to allow for water and/or air circulation throughout the container. In addition, handles 104 may be provided within one or more panels (preferably in panels configured to be positioned opposite from one another after assembly/folding) to improve ease of transport.

Sheet 100 further comprises additional panels 150, 155, 160 and 165. Panels 155 and 160 are configured to be positioned adjacent to and at least substantially parallel to panel 130. In the depicted embodiment, panels 155 and 160 are configured to be positioned at least substantially in the same plane. In other words, panels 155 and 160 collectively define a sidewall adjacent to and parallel with panel 130. However, as discussed below, other embodiments are contemplated in which similar panels may instead overlap. Similarly, panels 150 and 165 are configured to be positioned adjacent to and at least substantially parallel to panel 120. In the depicted embodiment, panels 150 and 165 are configured to be positioned at least substantially in the same plane so as to collectively define another sidewall adjacent to and parallel with panel 120.

Panel 120 comprises two locking tabs, namely, locking tab 122 and locking tab 124. As discussed in greater detail below, locking tabs 122 and 124 are configured to be positioned within respective slots defined in other panels to secure a lid or top portion of the container in place. Similarly, panel 130 comprises first locking tab 132 and a second locking tab 134.

Each of the various locking tabs 122/124 and 132/134 is positioned within a corresponding clearance aperture. More particularly, locking tabs 122 and 124 are positioned within clearance apertures 123 and 125, respectively. Similarly, locking tabs 132 and 134 are positioned within clearance apertures 133 and 135, respectively. Clearance apertures 123 and 125 are formed within a first rollover flap 126 and clearance apertures 133 and 135 are formed within a second rollover flap 136. Rollover flaps 126 and 136 are each configured to be folded over against their respective panels (panels 120 and 130, respectively) to expose their respective locking tabs. Clearance apertures 123, 125, 133, and 135 extend about the peripheries of their respective locking tabs other than along a base portion of the locking tabs at which the locking tabs are connected with their respective panels. The functionality of the clearance apertures will be discussed below.

Rollover flaps 126 and 136 further comprise additional locking tabs that extend in a different direction than the respective locking tabs 122/124 and 132/134 of each such rollover flap. More particularly, in the depicted embodiment, rollover flap 126 comprises a locking tab 128 that preferably extends in a direction at least substantially perpendicular to locking tabs 122 and 124 and another locking tab 129 that extends in an opposite direction to locking tab 128, but also at least substantially perpendicular to locking tabs 122 and 124. Similarly, rollover flap 136 comprises a locking tab 138 that preferably extends in a direction at least substantially perpendicular to locking tabs 132 and 134 and another locking tab 139 that extends in an opposite direction to locking tab 138, but also at least substantially perpendicular to locking tabs 132 and 134.

As illustrated in the figures, locking tabs 128/129 and 138/139 each extends beyond a peripheral edge of their respective panels, and a corresponding peripheral edge of their respective rollover flaps. Thus, locking tab 128 extends beyond a first peripheral edge of panel 120 and locking tab 129 extends beyond a second peripheral edge of panel 120 opposite from the first peripheral edge. Similarly, locking tab 138 extends beyond a first peripheral edge of panel 130 and locking tab 139 extends beyond a second peripheral edge of panel 130 opposite from the first peripheral edge. The functionality of this feature of locking tabs 128/129 and 138/139 will be discussed and be more apparent in connection with other figures below.

Panels 140 and 145 each comprises two slots formed at opposite ends of the respective panels. Thus, panel 140 comprises a first slot 142 positioned along a first peripheral edge of panel 140 and further comprises a second slot 143 positioned along a second peripheral edge of panel 140 opposite from the first peripheral edge. Similarly, panel 145 comprises a first slot 147 positioned along a first peripheral edge of panel 145 and further comprises a second slot 148 positioned along a second peripheral edge of panel 145 opposite from the first peripheral edge. Each of these slots 142, 143, 147, and 148 is configured to receive a corresponding locking tab from another panel, as discussed in greater detail below. In some embodiments, one or more (in some embodiments, all) of these slots 142, 143, 147, and 148 may comprise extended side cuts along opposing ends of the respective slots to improve the ease with which their respective locking tabs 128, 129, 138, and 139 can enter the slots during assembly and disassembly.

Each of panels 150, 155, 160, and 165 comprises another respective locking tab. Panel 150 comprises locking tab 152, panel 155 comprises locking tab 157, panel 160 comprises locking tab 162, and panel 165 comprises locking tab 167. Each of these locking tabs 152, 157, 162, and 167 comprises a shape that is substantially identical to that of locking tabs 122, 124, 132, and 134. However, unlike locking tabs 122, 124, 132, and 134, locking tabs 152, 157, 162, and 167 each comprises a hooked portion at one end. As discussed in greater detail below, following assembly, locking tabs 122, 124, 132, and 134 are configured to be positioned adjacent to and parallel with locking tabs 167, 152, 162, and 157, respectively, within a corresponding slot from another panel, and the hooked portions of locking tabs 152, 157, 162, and 167 are configured to engage a peripheral edge of such slot to maintain the container in a desired configuration.

Sheet 100 further comprises additional panels 170 and 180, both of which are configured to form a lid or top of a container, and therefore may be referred to herein as "top panels." Each of panels 170 and 180 comprises two corresponding locking flaps. More particularly, top panel 170 comprises a first locking flap 172 at a first end a second locking flap 174 at a second end opposite from the first end. Similarly, panel 180 comprises a first locking flap 182 positioned at a first end and a second locking flap 184 positioned at a second end opposite from the first end.

Each of the various locking flaps 172, 174, 182, and 184 comprises a door extending in the opposite direction relative to the respective locking flap. Thus, locking flap 172 comprises door 173, locking flap 174 comprises door 175, locking flap 182 comprises door 183, and locking flap 184 comprises door 185. As described in greater detail below, each of these doors is configured to pivot to an open position to expose a corresponding slot (see, for example, FIG. 4, in which door 185 has been pivoted to expose slot 186) for receiving locking tabs from other panels upon bending the respective locking flaps with respect to their panels. Although locking flap 184 is depicted as having been pivoted to expose slot 186 in FIG. 4, it should be understood that, in preferred embodiments, each of the various locking flaps, including locking flap 184, may be in a flat state with door 185 in a closed positioned prior to engaging the corresponding panel (panel 180) with one or more locking tabs.

In some embodiments, the sheet 100 may be configured such that, upon folding a panel with respect to one or more other panels during a folding process, one or more locking tabs are configured to automatically engage the door to cause the respective locking flap to bend and expose its corresponding slot. In some embodiments, the locking tabs and locking flaps may be positioned and configured to simultaneously enter the slot and cause the locking flap to pivot during the folding process.

Figure 2:
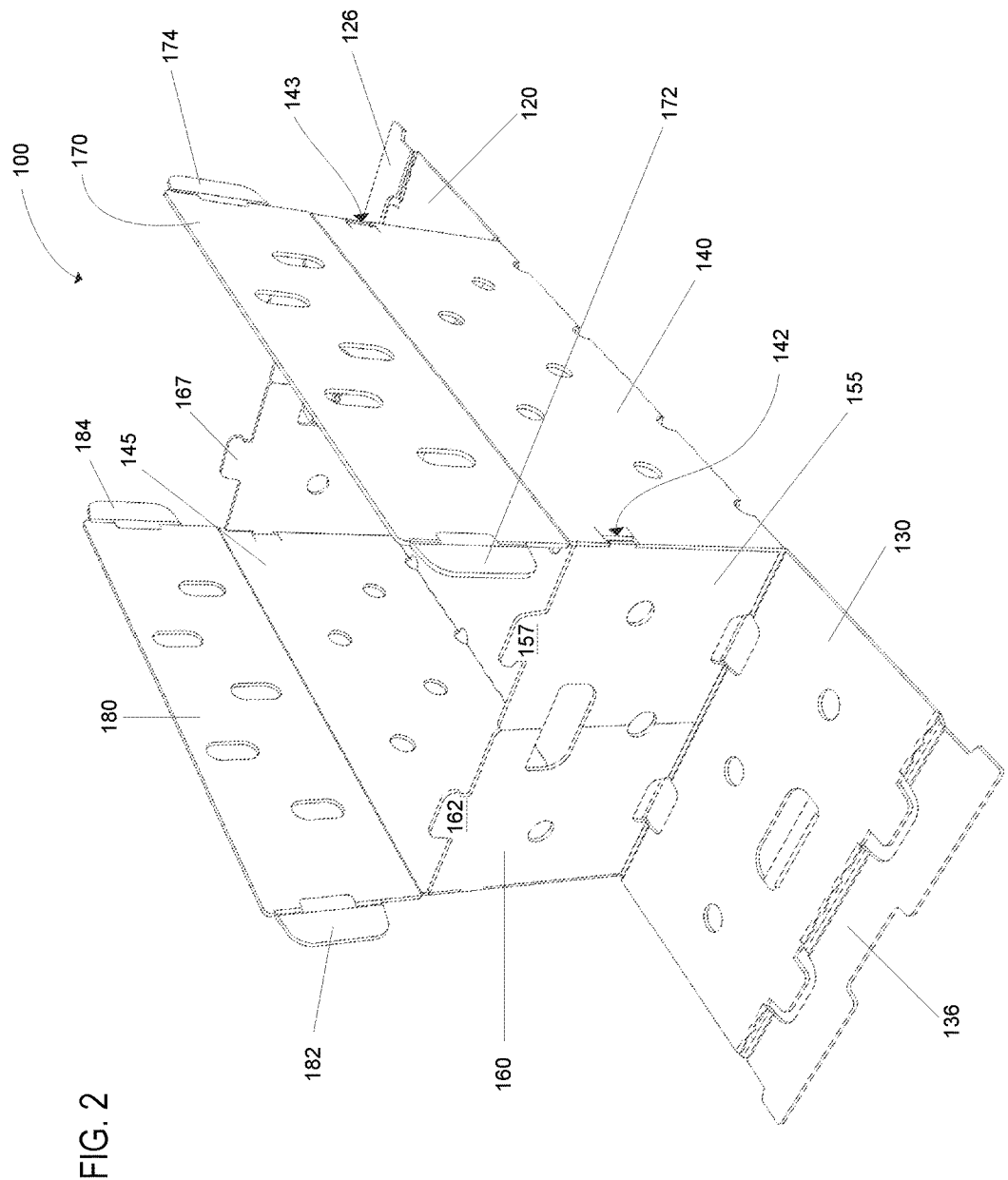
FIG. 2 is a perspective view of the sheet of FIG. 1 following an initial series of folding steps has taken place for folding the sheet into a container.

FIG. 2 depicts sheet 100 following an initial series of folding steps for folding the sheet 100 into a container, namely, a box. As shown in this figure, panels 155 and 160 have been folded up and the corresponding panels on the opposite side (panels 150 and 165) have also been folded up. Similarly, panels 140 and 145 have been folded up such that they define opposite side walls of the container and such that panels 155 and 160 are coplanar and together define another sidewall perpendicular to the sidewall defined by panels 140 and 145 (the same is true for the opposite side).

Figure 3:
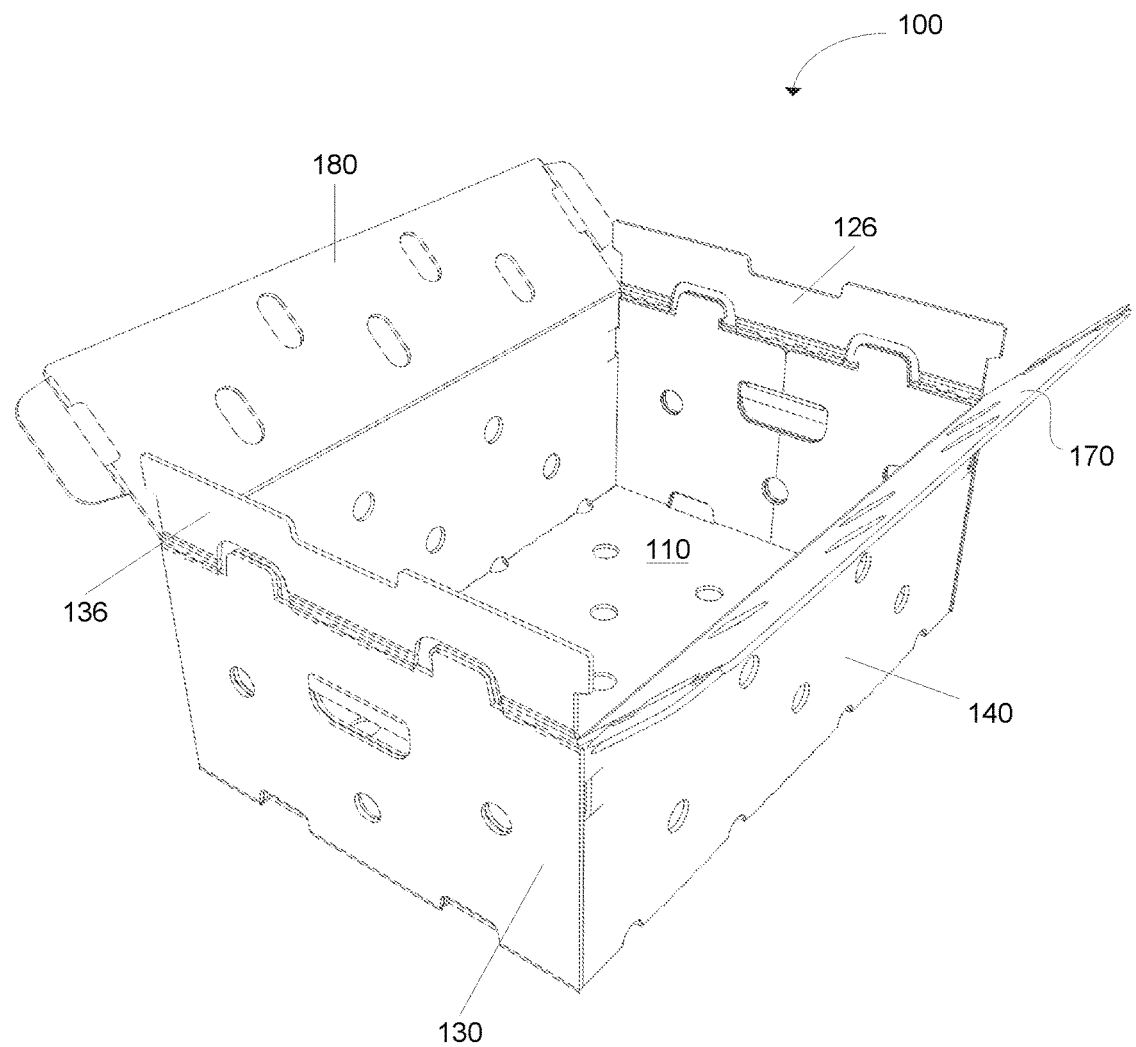
FIG. 3 is a perspective view of the sheet of FIG. 1 after additional folding steps have taken place.

FIG. 3 is a perspective view of sheet 100 after additional folding steps have taken place. More particularly, panels 120 and 130 have been folded up to form a first side wall that is parallel with coplanar panels 150 and 165 and a second side wall that is parallel with coplanar panels 155 and 160.

Figure 4:
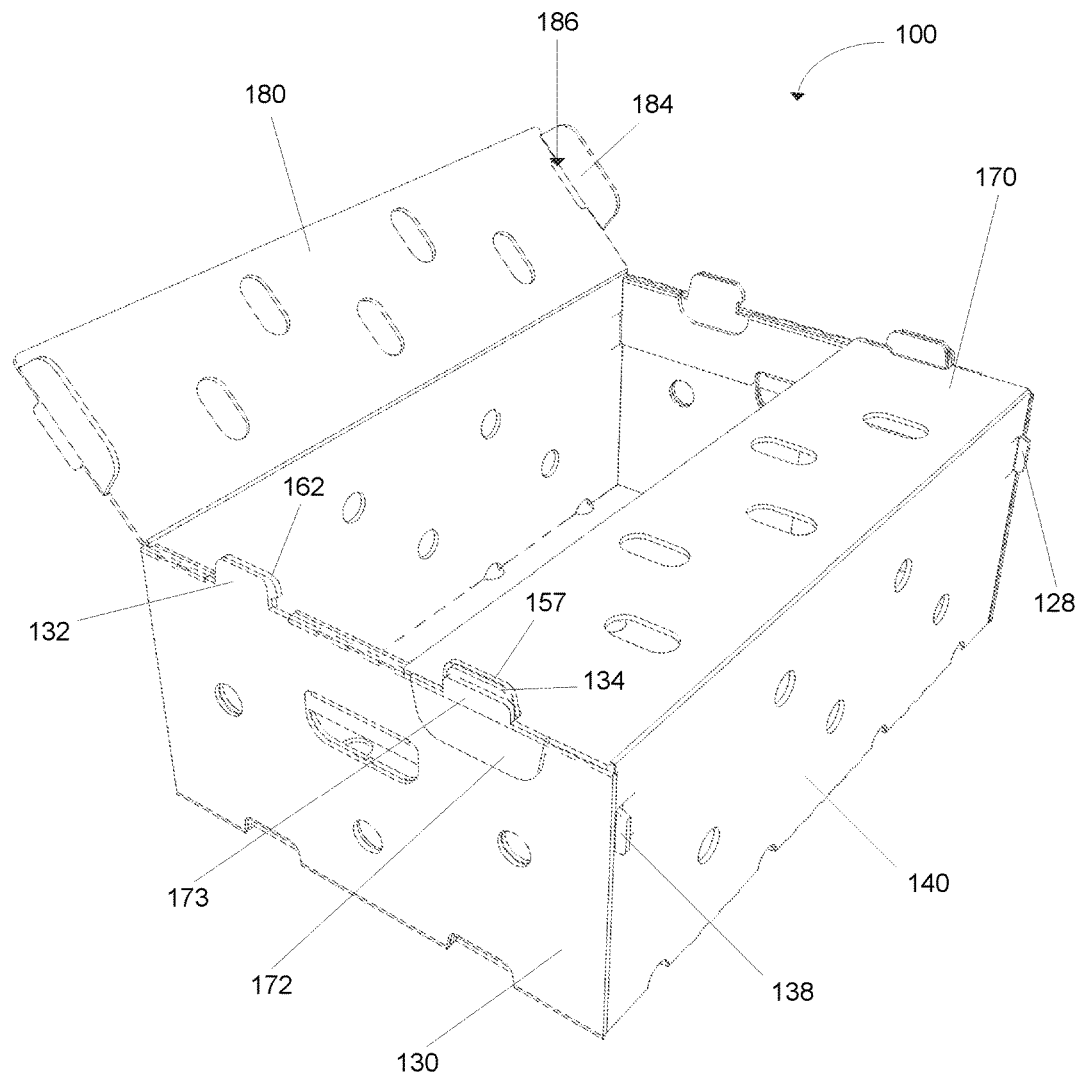
FIG. 4 is a perspective view of the sheet of FIG. 1 following further folding steps.

FIG. 4 is another perspective view of sheet 100 following further folding steps. In the state of FIG. 4, rollover flaps 126 and 136 have been folded into the interior of the container and locking tabs 128, 129, 138, and 139 have been inserted into slots 143, 148, 142, and 147, respectively. In some preferred embodiments, slots 142, 143, 147, and 148 may be positioned at least about one inch from the top of the assembled container to ensure integrity and prevent an area of weakness for the container. In preferred embodiments, slots 142, 143, 147, and 148 are positioned in an area of their respective panel that is between 50% of the height of the panel (i.e., with respect to slot 142, 50% of the distance between the border with panel 110 and the border with panel 170) and one inch from the top of the assembled container (i.e., with respect to slot 142, one inch from the border with panel 170).

In addition, in the stage depicted in FIG. 4, one of the two top panels—namely, top panel 170—has been folded down to engage locking flaps 172 and 174 at opposite ends of panel 170. Each of the various locking flaps, including locking flaps 172 and 174, may be configured such that, upon folding of a panel (in the depicted embodiment, top panel 170) towards the locking flap, one or more locking tabs are positioned and configured to engage a door of the locking flap to pivot the door to expose a slot for receiving one or more locking tabs. Thus, in the depicted embodiment, folding panel 170 towards locking tabs 134 and 157 may cause locking tabs 134 and 157 to engage door 173 and pivot locking flap 172 to expose a slot. Following such engagement, locking flap 172 and door 173 may be positioned parallel to locking tabs 134 and 157 and locking flap 172 may engage the exterior surface of panel 130, as depicted in FIG. 4. The same may be true for the other locking flaps.

The various clearance apertures may extend about the peripheries of their respective locking tabs to provide clearance to fold over the rollover flaps without folding over or otherwise deforming the corresponding locking tabs. In addition, these apertures may be configured such that, once the user has folded the rollover flap over the corresponding locking tab(s), the container may be released to allow for repositioning of a user's hands to complete assembly. Because the side walls/panels will naturally try to fall down, the clearance aperture(s) may also allow for an optimal amount of displacement so there is clearance for each of the wider side locking tabs (locking tabs 128/129 and 138/139) to reach its corresponding slot with minimal interaction with the side wall, thereby further decreasing the chance for deformation.

Thus, in certain preferred embodiments, the added width of the clearance aperture(s) relative to the locking tabs positioned within the clearance aperture(s) (locking tabs 122, 124, 132, and 134, for example) may be at least about 65% of the length of the side locking tab(s) (locking tabs 128, 129, 138, and 139, for example). In some embodiments, the added width of the clearance aperture(s) relative to the locking tabs positioned within the clearance aperture(s) may be at least about 75% of the length of the side locking tab(s). In some embodiments, the added width of the clearance aperture(s) relative to the locking tabs positioned within the clearance aperture(s) may be at least about 80% of the length of the side locking tab(s). In some embodiments, the added width of the clearance aperture(s) relative to the locking tabs positioned within the clearance aperture(s) may be between about 60% and about 100% of the length of the side locking tab(s). In some such more preferred embodiments, the added width of the clearance aperture(s) relative to the locking tabs positioned within the clearance aperture(s) may be between about 65% and about 85% of the length of the side locking tab(s).

Figure 5:
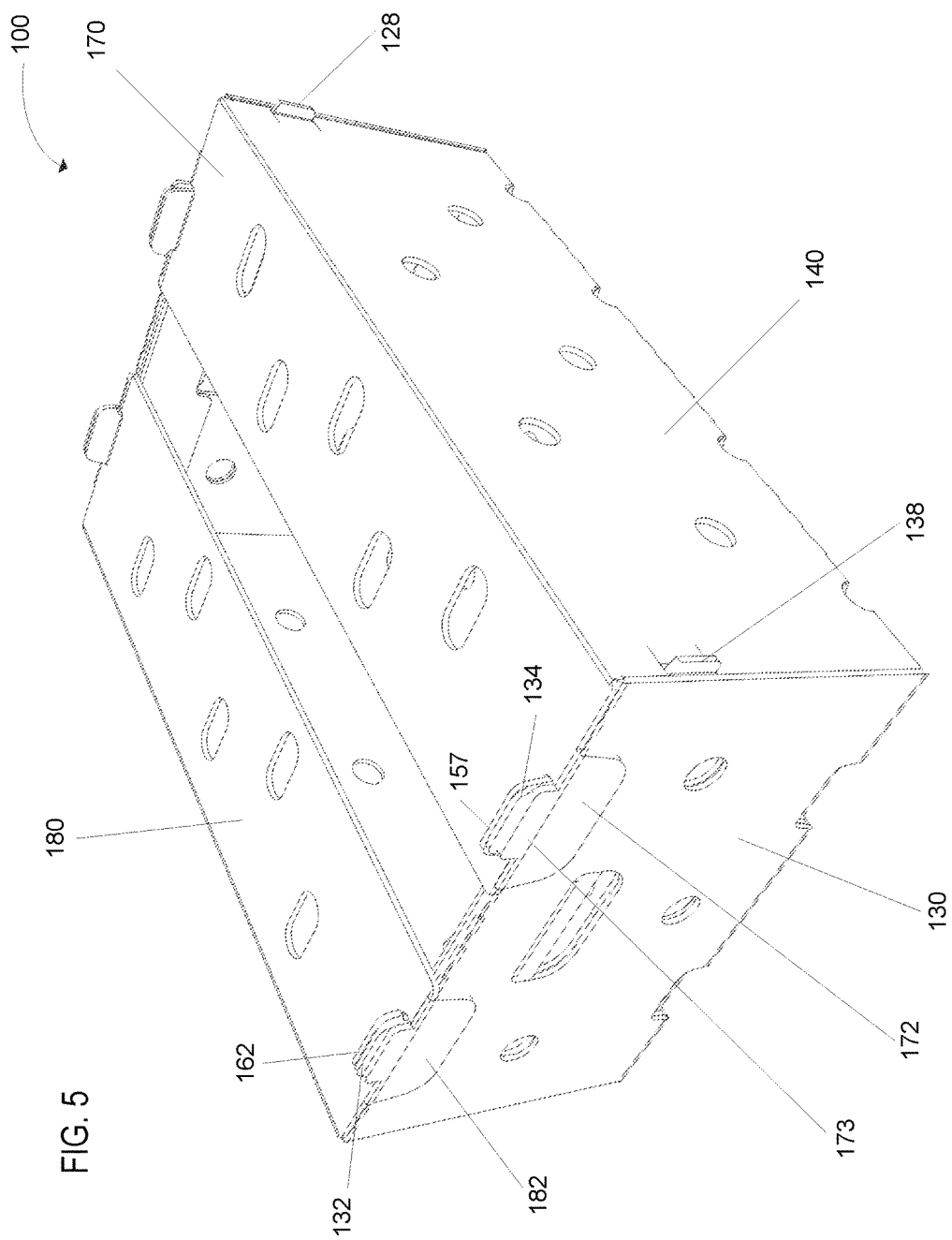
FIG. 5 is a perspective view of the sheet of FIG. 1 following completion of a folding process for folding the sheet into a container.

FIG. 5 is a perspective view of sheet 100 following completion of the folding process for folding the sheet into a container. As shown in this figure, the other top panel (panel 180) has been folded over to engage its corresponding locking flaps with corresponding locking tabs. In the position shown in FIG. 5, each of the various panels are locked into place to define a sturdy container suitable for use in storing and/or transporting produce, for example. In certain preferred embodiments, the structure and/or materials of the sheet 100 may further be configured to allow for the container to be used multiple times. In certain preferred embodiments, the sheet 100 may therefore comprise a corrugated plastic material.

Figure 6:
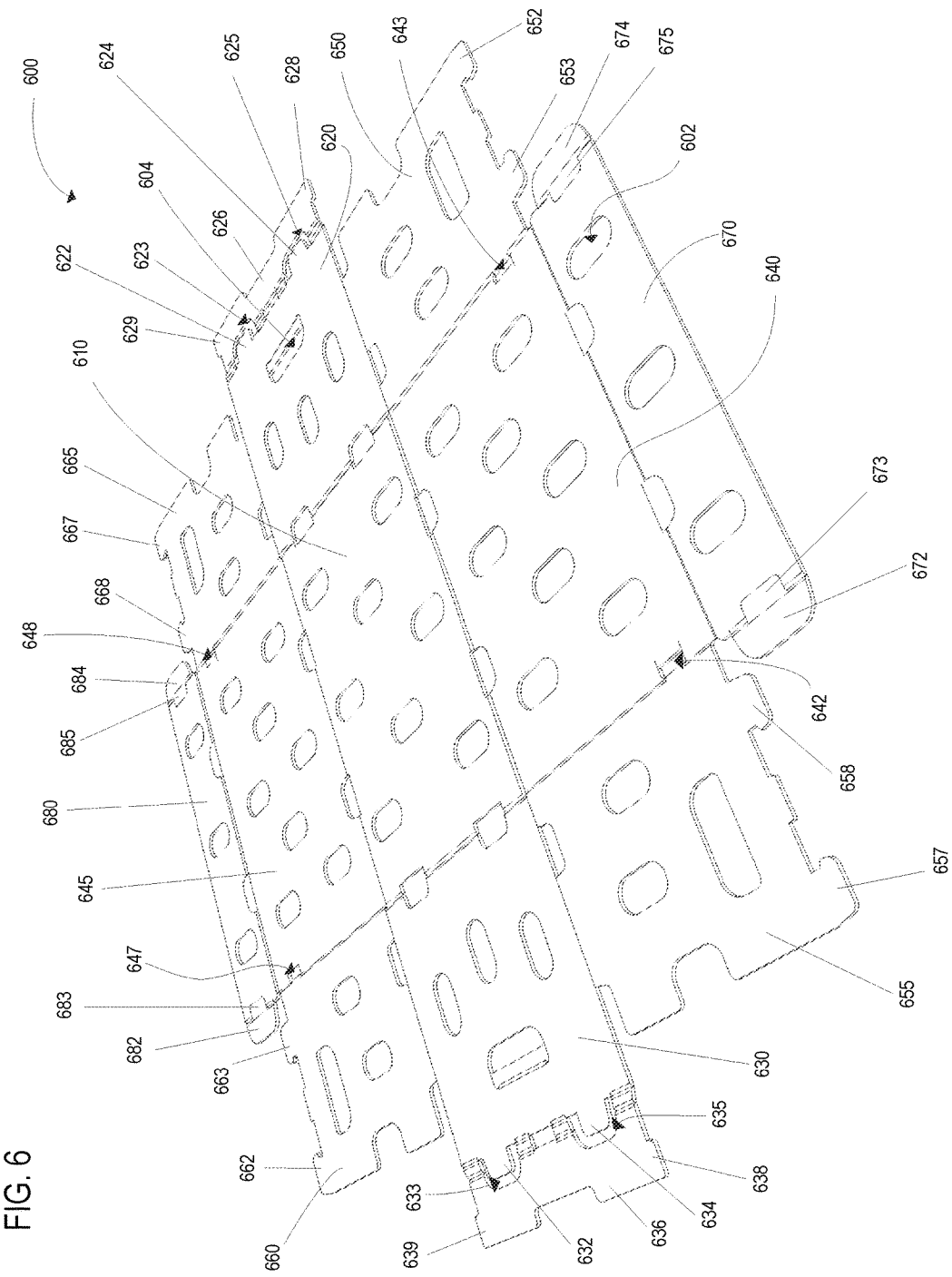
FIG. 6 illustrates another embodiment of a sheet configured for folding into a container.

FIG. 6 illustrates another embodiment of a sheet 600 configured for folding into a container, such as a produce container. Sheet 600 is similar to sheet 100 with a few differences explained below. Most notably, sheet 600 comprises three layers of side panels along two sides of the finished container. Two of these layers are made up by overlapping side panels each comprising two locking tabs. One such locking tab from a first such side panel is configured to be positioned adjacent to and parallel with another locking tab from a second such side panel, along with still another locking tab from a third side panel, and all three of these locking tabs are configured to be positioned within a single slot associated with a single locking flap, as explained in greater detail below.

Similar to sheet 100, sheet 600 comprises a plurality of panels configured to be folded with respect to one another during a folding/assembly process. More particularly, sheet 600 comprises a first panel 610 that, when folded/assembled, will become a bottom to a container. Similarly, sheet 600 comprises a second panel 620 configured to serve as a side wall of the container, a third panel 630 configured to serve as another side wall of the container opposite from second panel 620, a fourth panel 640 configured to serve as another side wall of the container perpendicular to the side walls formed by second panel 620 and third panel 630, and a fifth panel 645 configured to serve as another side wall of the container opposite from that formed by fourth panel 640. One or more vent openings 602 may be formed in one or more of the various panels to allow for water and/or air circulation throughout the container. In addition, handles 604 may be provided within one or more panels to improve ease of transport.

Sheet 600 further comprises additional panels 650, 655, 660 and 665. Panels 655 and 660 are configured to be positioned adjacent to and at least substantially parallel to panel 630. In the depicted embodiment, panels 655 and 660 are configured to be positioned adjacent to one another in an overlapping configuration (ultimately, along with panel 630). Similarly, panels 650 and 665 are configured to be positioned adjacent to and at least substantially parallel to panel 620. In the depicted embodiment, panels 650 and 665 are configured to be positioned adjacent to one another in an overlapping configuration.

Panel 620 comprises two locking tabs, namely, locking tab 622 and locking tab 624. As discussed in greater detail below, locking tabs 622 and 624 are configured to be positioned within respective slots defined in other panels to secure a lid or top portion of the container in place. Similarly, panel 630 comprises first locking tab 632 and a second locking tab 634.

Each of the various locking tabs 622/624 and 632/634 is positioned within a corresponding clearance aperture. More particularly, locking tabs 622 and 624 are positioned within clearance apertures 623 and 625, respectively. Similarly, locking tabs 632 and 634 are positioned within clearance apertures 633 and 635, respectively. Clearance apertures 623 and 625 are formed within a first rollover flap 626 and clearance apertures 633 and 635 are formed within a second rollover flap 636. Rollover flaps 626 and 636 are each configured to be folded over against their respective panels (panels 620 and 630, respectively) to expose their respective locking tabs.

Rollover flaps 626 and 636 further comprise additional locking tabs that extend in a different direction (perpendicular) than the respective locking tabs 622/624 and 632/634 of each such rollover flap.

As illustrated in the figures, locking tabs 628/629 and 638/639 each extends beyond a peripheral edge of their respective panels, and a corresponding peripheral edge of their respective rollover flaps.

Panels 640 and 645 each comprises two slots formed at opposite ends of the respective panels. Thus, panel 640 comprises a first slot 642 positioned along a first peripheral edge of panel 640 and further comprises a second slot 643 positioned along a second peripheral edge of panel 640 opposite from the first peripheral edge. Similarly, panel 645 comprises a first slot 647 positioned along a first peripheral edge of panel 645 and further comprises a second slot 648 positioned along a second peripheral edge of panel 645 opposite from the first peripheral edge. Each of these slots 642, 643, 647, and 648 is configured to receive a corresponding locking tab from another panel, namely, locking tabs 638, 628, 639, and 629, respectively.

Each of panels 650, 655, 660, and 665 comprises two additional respective locking tabs each. Thus, panel 650 comprises locking tabs 652 and 653, panel 655 comprises locking tabs 657 and 658, panel 660 comprises locking tabs 662 and 663, and panel 665 comprises locking tabs 667 and 668. Like locking tabs 152, 157, 162, and 167, in some embodiments each of locking tabs 652, 653, 657, 658, 662, 663, 667, and 668 may comprise a hooked portion at one end. As shown in FIG. 6, these hooked portions may face each other. As discussed in greater detail below, following assembly, an upper locking tab of each of the aforementioned locking tabs is configured to be positioned adjacent to and parallel with a lower locking tab of another panel, and vice versa. Moreover, these two adjacent locking tabs are further configured to be positioned adjacent to a third locking tab, that may be exposed upon pivoting of a locking flap, such that three adjacent locking tabs may be positioned within a single corresponding slot from another panel, and the hooked portions of one or more of these locking tabs may be configured to engage a peripheral edge of such slot to maintain the container in a desired configuration.

Sheet 600 further comprises additional panels 670 and 680, both of which are configured to form a lid or top of a container. Each of panels 670 and 680 comprises two corresponding locking flaps. More particularly, top panel 670 comprises a first locking flap 672 at a first end a second locking flap 674 at a second end opposite from the first end. Similarly, panel 680 comprises a first locking flap 682 positioned at a first end and a second locking flap 684 positioned at a second end opposite from the first end.

Each of the various locking flaps 672, 674, 682, and 684 comprises a door extending in the opposite direction relative to the respective locking flap. Thus, locking flap 672 comprises door 673, locking flap 674 comprises door 675, locking flap 682 comprises door 683, and locking flap 684 comprises door 685. As described in greater detail below, each of these doors is configured to pivot to an open position to expose a corresponding slot (see, for example, FIG. 9, in which door 685 has been pivoted to expose slot 686) for receiving locking tabs from other panels upon bending the respective locking flaps with respect to their panels.

Sheet 600 may be configured such that, upon folding a panel with respect to one or more other panels during a folding process, one or more locking tabs are configured to automatically engage the door to cause the respective locking flap to bend and expose its corresponding slot. In some embodiments, the locking tabs and locking flaps may be positioned and configured to simultaneously enter the slot and cause the locking flap to pivot during the folding process.

Figure 7:
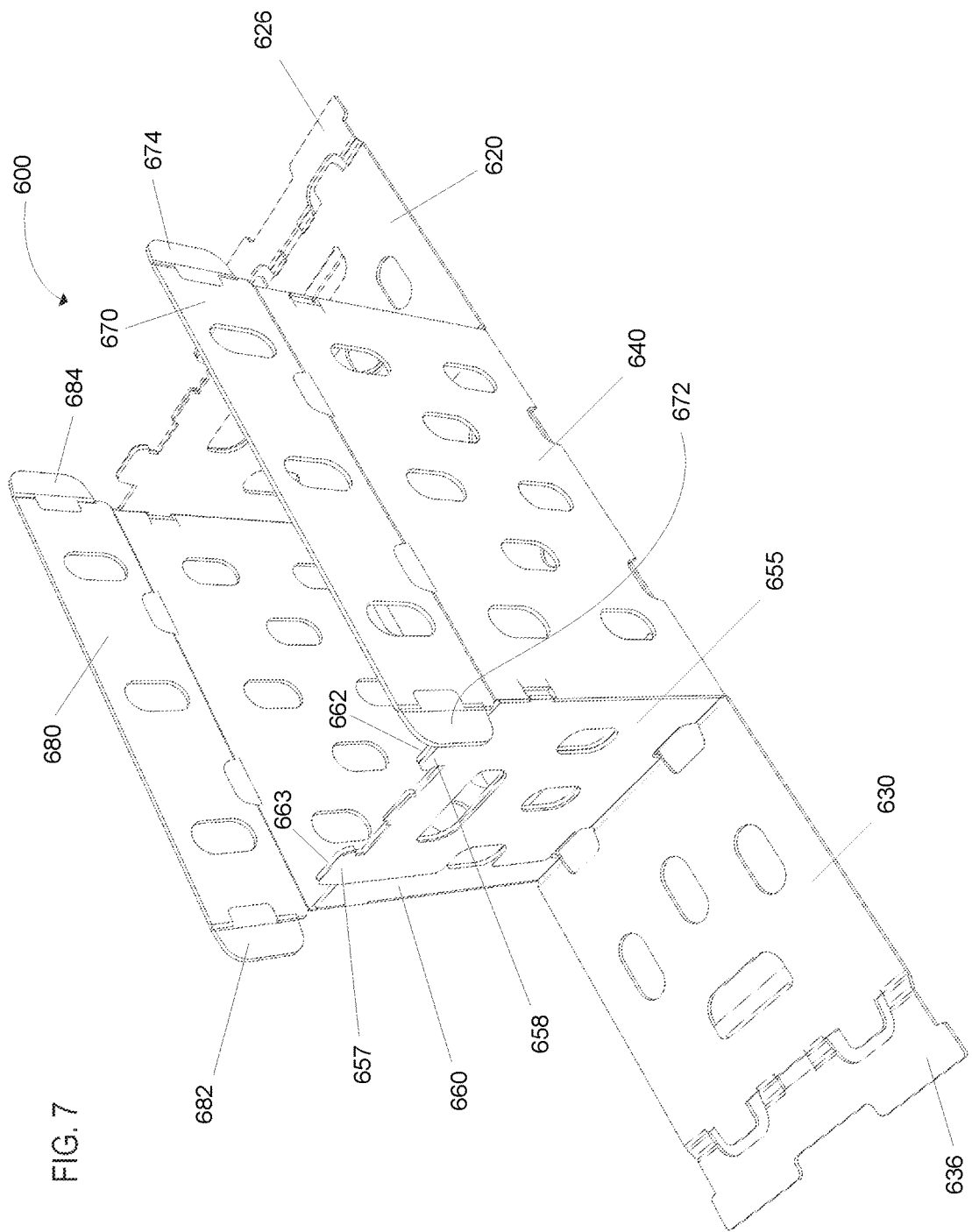
FIG. 7 is a perspective view of the sheet of FIG. 6 following an initial series of folding steps has taken place for folding the sheet into a container.

FIG. 7 depicts sheet 600 following an initial series of folding steps for folding the sheet 600 into a container, namely, a box. As shown in this figure, panels 655 and 660 have been folded up, along with the corresponding panels on the opposite side (panels 650 and 665). Similarly, panels 640 and 645 have been folded up such that they define opposite side walls of the container and such that panels 655 and 660 are positioned in an overlapping configuration to define a pair of parallel sidewalls perpendicular to the sidewall defined by panels 640 and 645 (the same is true for the opposite side).

As also shown in FIG. 7, locking tabs 663 and 657 have been positioned adjacent to one another. Likewise, locking tabs 658 and 662 have been positioned adjacent to one another.

Figure 8:
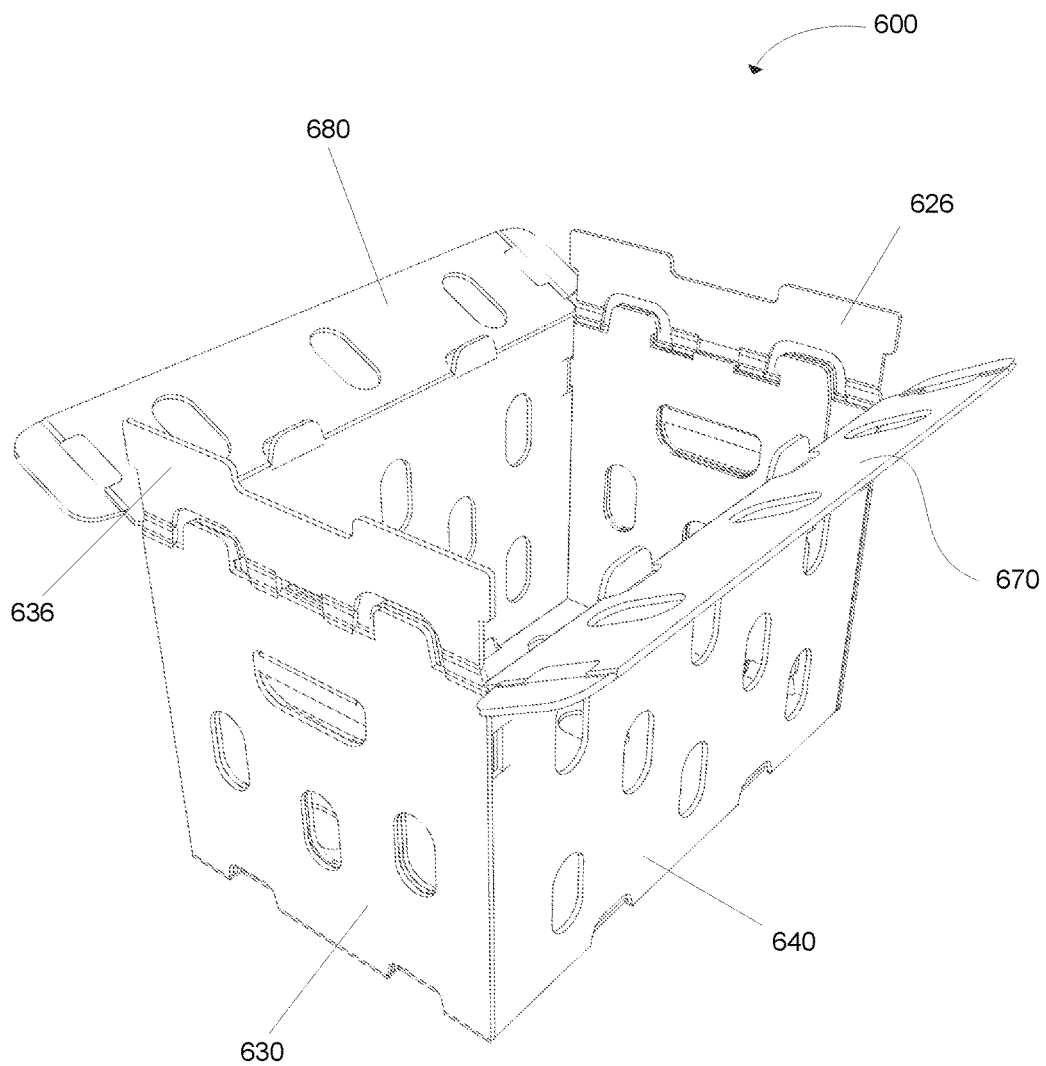
FIG. 8 is a perspective view of the sheet of FIG. 6 after additional folding steps have taken place.

FIG. 8 is a perspective view of sheet 600 after additional folding steps have taken place. More particularly, panels 620 and 630 have been folded up to form a first side wall that is parallel with overlapping panels 650 and 665 and a second side wall that is parallel with overlapping panels 655 and 660.

Figure 9:
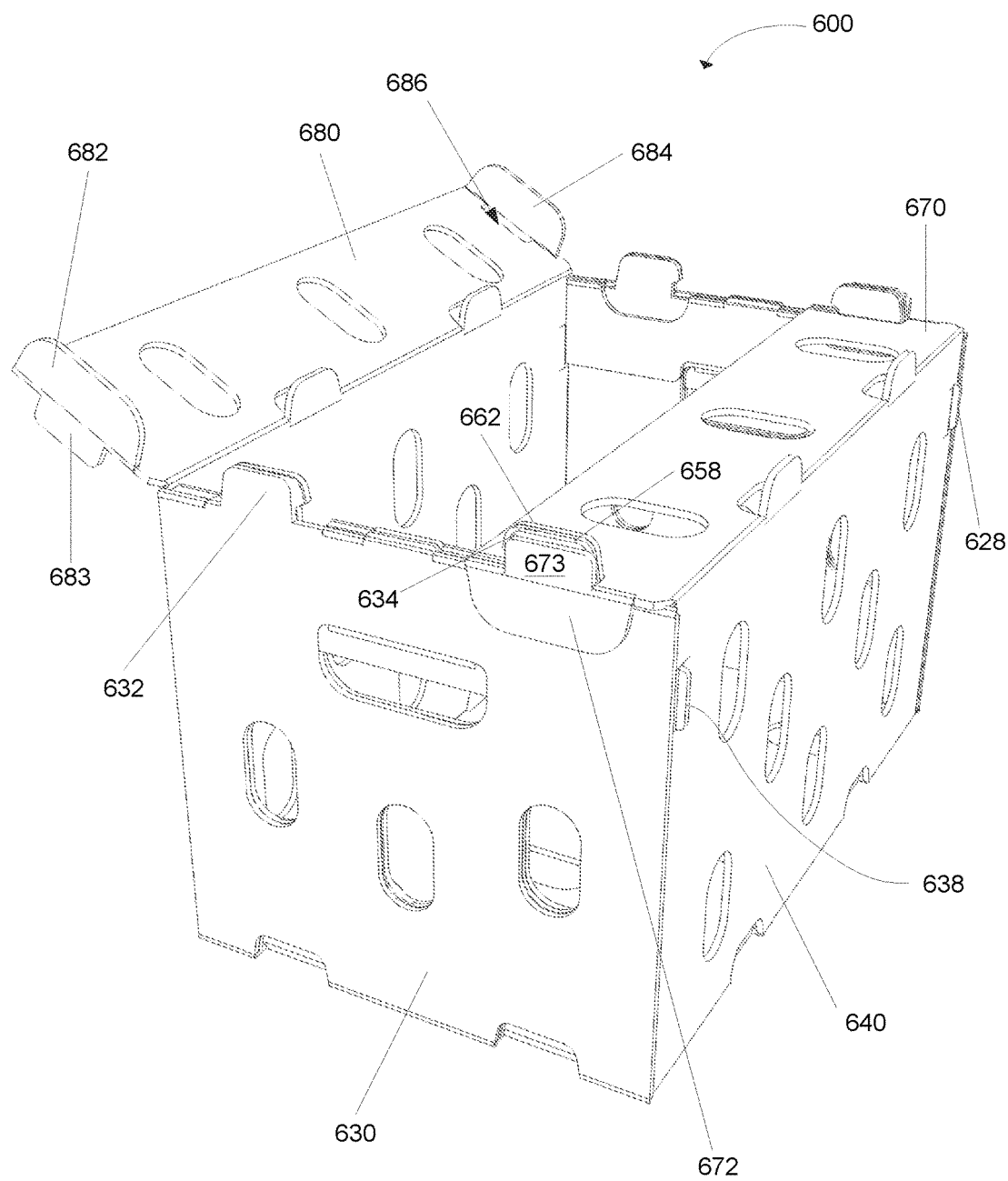
FIG. 9 is a perspective view of the sheet of FIG. 6 following further folding steps.

FIG. 9 is another perspective view of sheet 600 following further folding steps. In the state of FIG. 9, rollover flaps 626 and 636 have been folded into the interior of the container and locking tabs 628, 629, 638, and 639 have been inserted into slots 643, 647, 642, and 648, respectively.

In addition, in the stage depicted in FIG. 9, one of the two top panels—namely, top panel 670—has been folded down to engage locking flaps 672 and 674 at opposite ends of panel 670. With respect to locking flap 672, it has been pivoted against panel 630, and the slot exposed by pivoting door 673 of locking flap 672 has been filled by locking flaps 634, 658, and 662. Thus, in the closed lid configuration, door 673 is positioned parallel to three locking tabs. The same is true for the other locking flaps and their corresponding locking tabs and slots.

Figure 10:
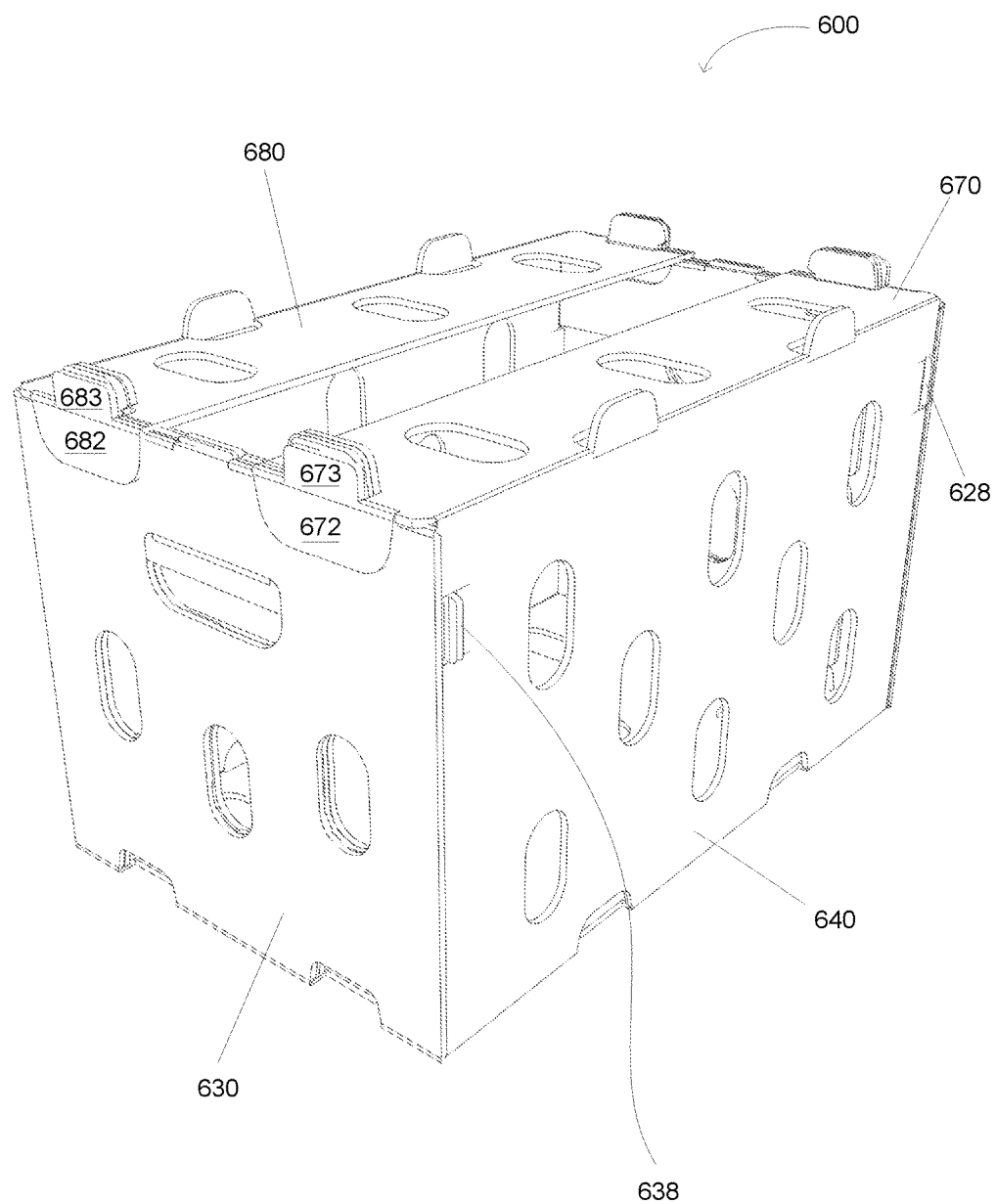
FIG. 10 is a perspective view of the sheet of FIG. 6 following completion of a folding process for folding the sheet into a container.

FIG. 10 is a perspective view of sheet 600 following completion of the folding process for folding the sheet 600 into a container. As shown in this figure, the other top panel (panel 680) has been folded over to engage its corresponding locking flaps with corresponding locking tabs. In the position shown in FIG. 10, each of the various panels are locked into place to define a sturdy container suitable for use in storing and/or transporting produce, for example. In certain preferred embodiments, the structure and/or materials of the sheet 600 may further be configured to allow for the container to be used multiple times.

With respect to any of the various embodiments disclosed herein, some such embodiments may be configured such that one or more (in some cases, all) of the various panels are made up of corrugated flutes. In some such embodiments, the corrugated flutes and panels may be configured such that, after assembly into a container, one or more (in some cases, all) of the side locking tabs (e.g., locking tab 138 in sheet/container 100 and locking tab 638 in sheet/container 600) have corrugated flutes that are angled with respect to (in some cases at least substantially perpendicular to) the corrugated flutes of the panel within which their respective slots have been formed (e.g., slot 142 in panel 140 with respect to sheet/container 100 and slot 642 in panel 640 with respect to sheet/container 600). This may provide for additional rigidity and flexibility for repeated assembly and disassembly. If the flutes of these side locking tabs were instead orientated in the same direction as the panels of their corresponding slots, the side locking tabs may be more prone to bending between the flutes, which could cause the container to be less sturdy.

Figure 11:
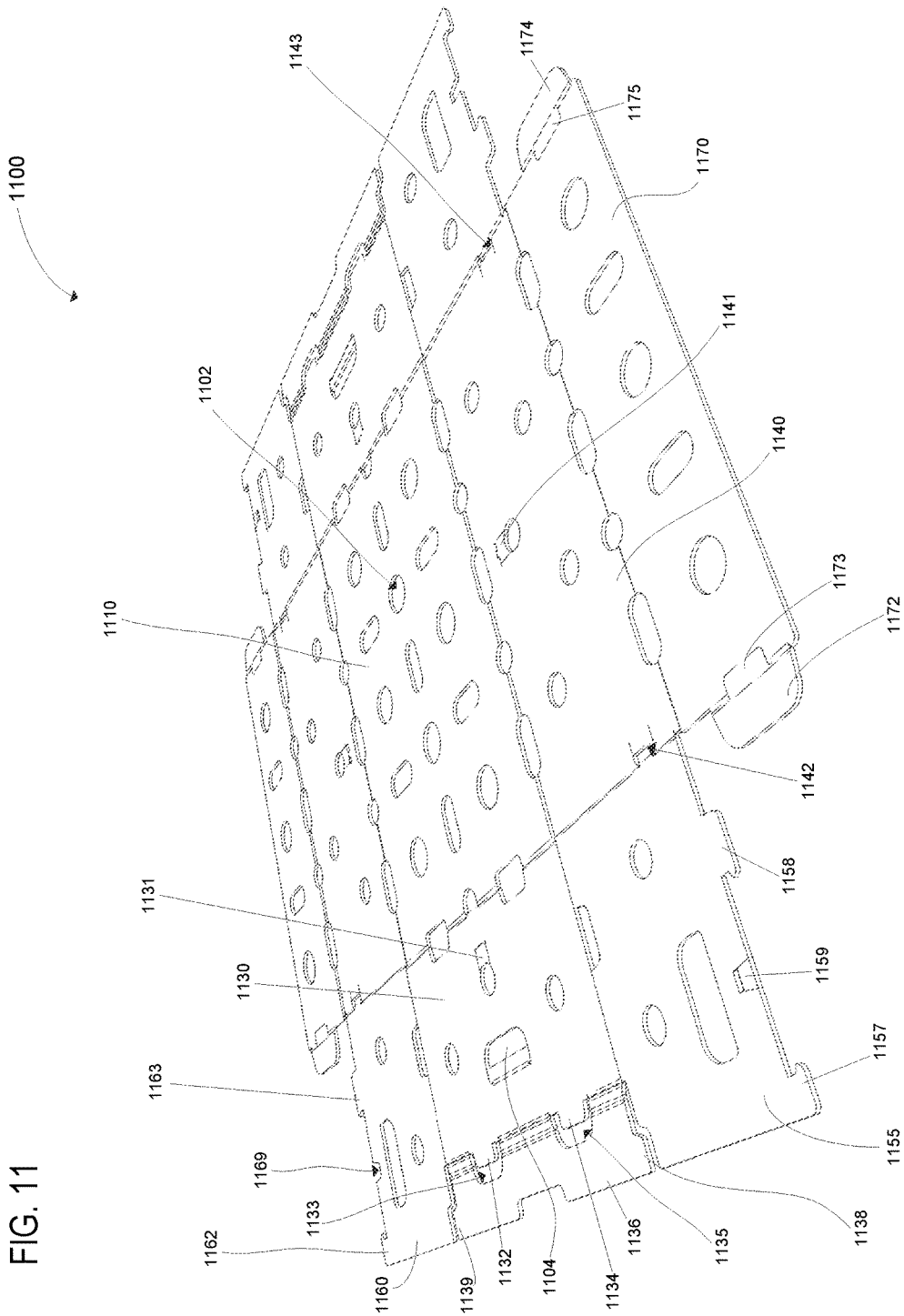
FIG. 11 illustrates yet another embodiment of a sheet for folding into a container.

FIG. 11 illustrates another embodiment of a sheet 1100 configured for folding into a container, such as a produce container. FIGS. 11-16 depict sheet 1100 in various stages of a folding process for folding sheet 1100 into a container. FIG. 17 depicts a plurality of such containers bound together utilizing a novel feature of the containers, as described in greater detail below.

Sheet 1100 is similar to sheets 100 and 600 with a few differences explained below. For example, sheet 1100 comprises a pair of side panels having bendable tabs 1159 and an opposing pair of side panels comprising cutouts 1169 configured to receive the bendable tabs 1159 to hold the two side panels in place during a portion of the folding process. More particularly, in the depicted embodiments, each bendable tab 1159 couples panel 1155 to the panel 1160 and holds panels 1155 and 1160 in place with respect to another adjacent side panel 1130, which may facilitate additional folding steps without requiring manually holding these panels in place, as described in greater detail below. Although these elements are depicted in connection with sheet 1100 and its associated container, it should be understood that the same or similar bendable tabs and cutouts may be provided on any of the other containers described herein.

Another example of an alternative feature on container 1100, and which may also be provided on other containers described herein, are strapping flaps, which may be positioned along one or more side panels and may be configured to facilitate tensioning of strapping material for strapping together multiple containers. In some embodiments, as described in greater detail below, these strapping flaps may be configured to be selectively extended from the resulting container so as to engage a strapping material extending along the sidewall. In some embodiments, strapping flaps may be configured to extend, or selectively be extended, from each sidewall of the resulting container. In the depicted embodiment, strapping flap 1131 is shown on sidewall panel 1130 and strapping flap 1141 is shown on sidewall panel 1140. Similar strapping flaps may be present on panels positioned opposite from sidewall panels 1130 and 1140, as shown in FIG. 11, but are not specifically referenced herein for the sake of brevity.

Like sheet 600, sheet 1110 comprises panels configured to fold into a container having three layers of side panels along at least a portion of two sides of the finished container. In other words, like sheet 600, sheet 1100 comprises overlapping side panels 1155 and 1160, along with a third layer of two opposing sidewalls defined by panel 1130. Like sheet 600, these overlapping side panels 1155 and 1160 partially overlap, which provides for increased strength in the resulting container.

Two of the three layers of this sidewall (layers defined by side panels 1155 and 1160) are defined by panels comprising two locking tabs each. More particularly, side panel 1155 comprises locking tabs 1157 and 1158, both of which may comprise hooked end portions that, as shown in FIG. 11, may be directed towards one another. One such locking tab from a first such side panel is configured to be positioned adjacent to and parallel with another locking tab from a second such side panel, along with still another locking tab from a third side panel, and all three of these locking tabs are configured to be positioned within a single slot associated with a single locking flap, as previously explained.

Similar to sheets 100 and sheet 600, sheet 1100 comprises a panel 1110 that, when folded/assembled, will become a bottom to a container. Similarly, sheet 1100 comprises a panel 1130, as previously mentioned, which is configured to serve as part of a side wall of the container, along with another panel configured to serve as part of another side wall of the container opposite from panel 1130. Each of these opposing sidewalls is also defined by two other panels, respectively. Thus, a sidewall is, at least in part, defined by panels 1130, 1155, and 1160, and an opposite sidewall is similarly defined, at least in part, by three layers/panels.

Similarly, another panel 1140 is configured to serve as another side wall of the container perpendicular to the side walls formed by panel 1130 (and another panel configured to serve as another side wall of the container opposite from that formed by fourth panel 1140). One or more vent openings 1102 may be formed in one or more of the various panels to allow for water and/or air circulation throughout the container. In addition, handles 1104 may be provided within one or more panels to improve ease of transport.

As also shown in FIG. 11, panel 1130, along with its opposing panel, comprises two locking tabs, namely, locking tab 1132 and locking tab 1134. As discussed in greater detail below, locking tabs 1132 and 1134 are configured to be positioned within respective slots defined in other panels to secure a lid or top portion of the container in place.

Each of the various locking tabs 1132/1134 (along with those on the opposite panel) is positioned within a corresponding clearance aperture. More particularly, locking tabs 1132 and 1134 are positioned within clearance apertures 1133 and 1135, respectively. Clearance apertures 1133 and 1135 are formed within a rollover flap 1136. Rollover flap 1136, along with the rollover flap on the opposite panel, are each configured to be folded over against their respective panels to expose their respective locking tabs.

Rollover flap 1136, along with its opposing rollover flap, further comprise additional locking tabs that extend in a different direction (perpendicular) than the respective locking tabs 1132/1134 of each such rollover flap. Each of these locking tabs, such as locking tab 1138, for example, extends beyond a peripheral edge of its respective panel, and a corresponding peripheral edge of its respective rollover flap.

Panel 1140, along with its opposite panel, comprises two slots formed at opposite ends of the respective panels. Thus, panel 1140 comprises a first slot 1142 positioned along a first peripheral edge of panel 1140 and further comprises a second slot 1143 positioned along a second peripheral edge of panel 1140 opposite from the first peripheral edge. Each of these slots 1142/1143 (along with the slots of the opposing panel) is configured to receive a corresponding locking tab from another panel. For example, locking tab 1138 fits within slot 1142, and so on.

Each of the corner panels, e.g., panels 1155 and 1160 comprises two additional respective locking tabs each. Thus, panel 1155 comprises locking tabs 1157 and 1158. As shown in the figures, these locking tabs may each comprise a hooked portion at one end, which may face each other. As discussed in greater detail below, following assembly, an upper locking tab of each of the aforementioned locking tabs is configured to be positioned adjacent to and parallel with a lower locking tab of another panel, and vice versa. Moreover, these two adjacent locking tabs are further configured to be positioned adjacent to a third locking tab, that may be exposed upon pivoting of a locking flap, such that three adjacent locking tabs may be positioned within a single corresponding slot from another panel, and the hooked portions of one or more of these locking tabs may be configured to engage a peripheral edge of such slot to maintain the container in a desired configuration.

Sheet 1100 further comprises additional panels configured to form a lid or top of a container. Each of these panels (panel 1170, for example) comprises two corresponding locking flaps. More particularly, top panel 1170 comprises a first locking flap 1172 at a first end a second locking flap 1174 at a second end opposite from the first end. Each of these locking flaps 1172/1174 comprises a door extending in the opposite direction relative to the respective locking flap. Thus, locking flap 1172 comprises door 1173 and locking flap 1174 comprises door 1175. As previously described, each of these doors is configured to pivot to an open position to expose a corresponding slot for receiving locking tabs from other panels upon bending the respective locking flaps with respect to their panels.

Sheet 1100 may further be configured such that, upon folding a panel with respect to one or more other panels during a folding process, one or more locking tabs are configured to automatically engage the door to cause the respective locking flap to bend and expose its corresponding slot. In some embodiments, the locking tabs and locking flaps may be positioned and configured to simultaneously enter the slot and cause the locking flap to pivot during the folding process.

Figure 12:
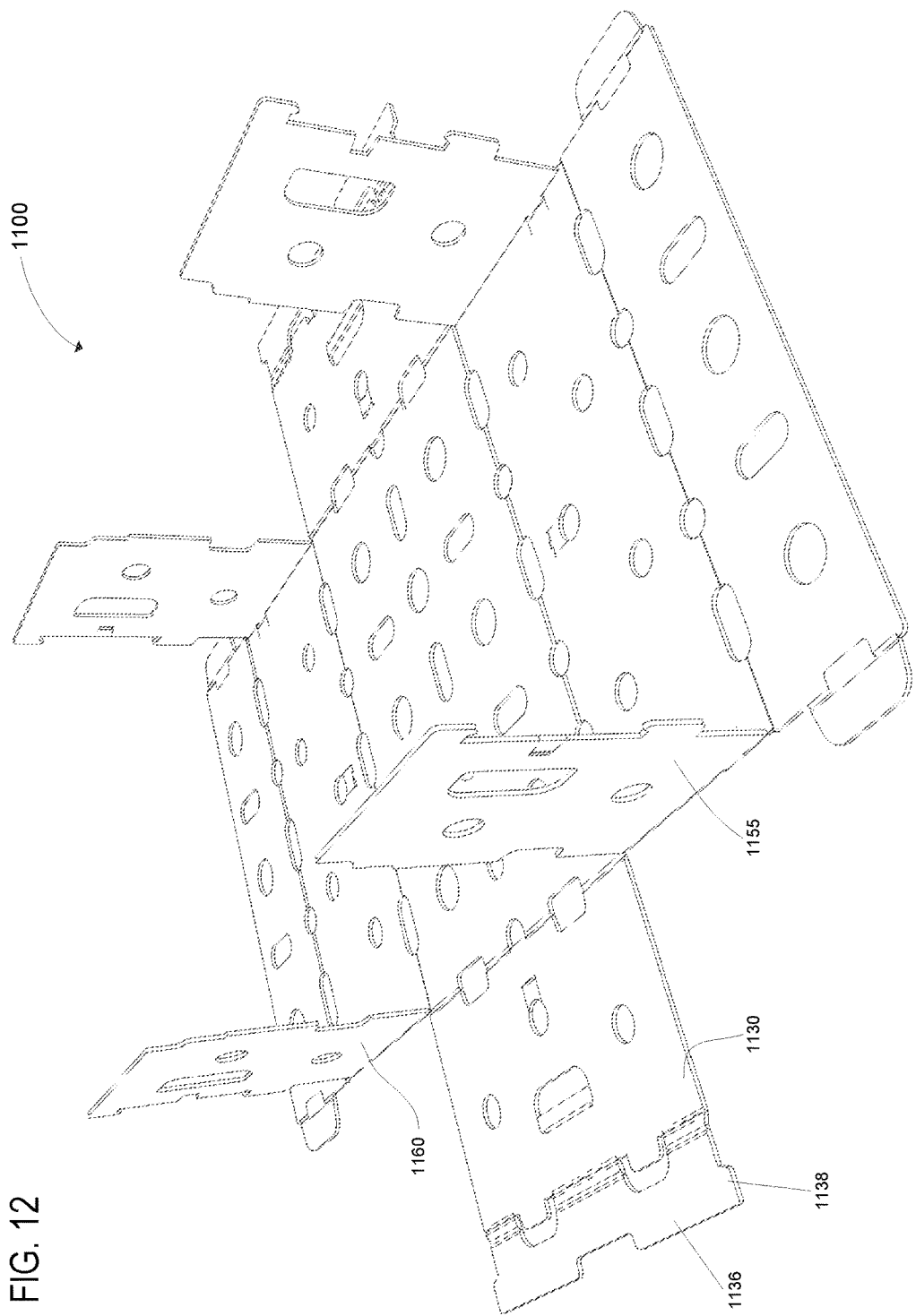
FIG. 12 is a perspective view of the sheet of FIG. 11 following an initial series of folding steps has taken place for folding the sheet into a container.
Figure 13:
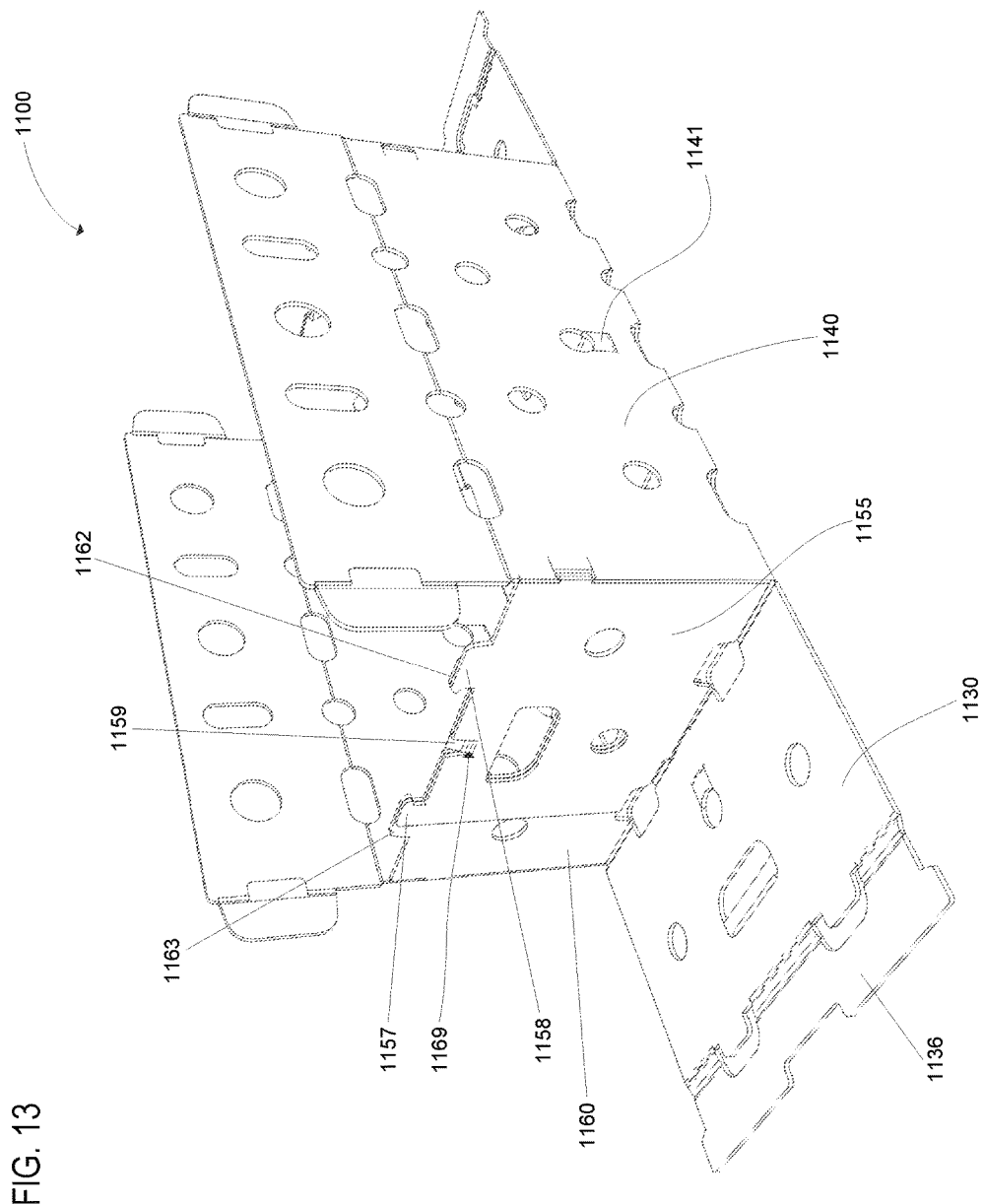
FIG. 13 is a perspective view of the sheet of FIG. 11 after additional folding steps have taken place.

FIG. 12 depicts sheet 1100 following an initial series of folding steps for folding the sheet 1100 into a container, namely, a box. More particularly, four of the side panels (side panels 1155 and 1160, along with their respective opposing panels) have been folded up. As shown in FIG. 13, panels 1155 and 1160 have been folded up, along with the corresponding panels on the opposite side, in an overlapping configuration by folding side panel 1140.

As also shown in FIG. 13, locking tabs 1163 and 1157 have been positioned adjacent to one another. Likewise, locking tabs 1158 and 1162 have been positioned adjacent to one another. In addition, FIG. 13 depicts bendable tab 1159 inserted within its respective cutouts 1169. Although, as best seen in FIGS. 11 and 12, in certain preferred embodiments, bendable tab 1159 may be formed in the shape of, or at least substantially in the shape of (slight variations not substantially impacting the locking ability should be considered within the scope of "at least substantially in the shape of"), a trapezoid. Similarly, cutouts 1169 may be formed in the shape of, or at least substantially in the shape of, a trapezoid. In some such embodiments, the shape of the trapezoid may be configured such that the wider portions of the bendable tabs 1159 and/or cutouts 1169 are at the peripheral edges of their respective panels and/or the upper portion of the resulting container. In some preferred embodiments, the flap may be at least as large as the corresponding cutout, which may facilitate a desired engagement to allow for their respective side panels (side panels 1155 and 1160, for example) to be held in position without requiring manual force while additional folding steps are performed. In some such embodiments, the flap may be slightly larger than the corresponding cutout, which may facilitate a more rigid coupling between respective side panels.

Other shapes, sizes, and/or other configurations of tabs and cuts for temporarily holding adjacent panels together to facilitate folding are also contemplated. For example, rectangular tabs and cutouts may be provided. As another example, the depicted trapezoidal shapes may be reversed such that the wider portion of one or both of the respective trapezoidal shapes may be positioned on the lower side of the shape(s) rather than the upper side. As another alternative, the two trapezoidal shapes may be reversed such that one has the wider portion on top and the other on the bottom, or one may comprise a rectangular shape and the other a trapezoidal shape, so as to facilitate a desired temporary locking.

Figure 14:
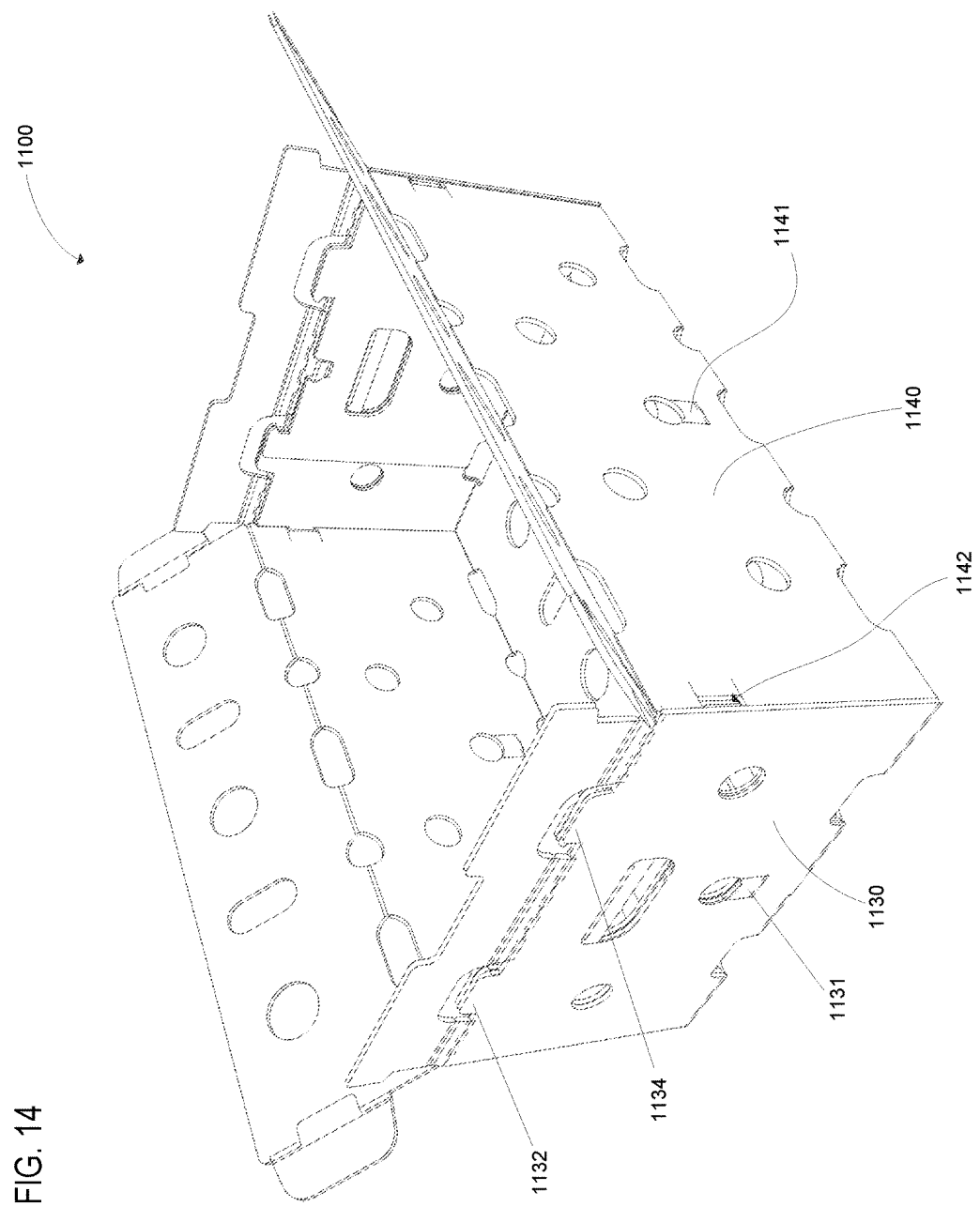
FIG. 14 is a perspective view of the sheet of FIG. 11 following additional folding steps in the folding process.

After the overlapping side panels on opposing sides have been locked into place using the flaps and cutouts, as described above, the third layer/panel of the opposing sidewalls may be folded up against the other two, as shown in FIG. 14. As shown in this figure, panels 1130 and its opposing counterpart panel have been folded up to form a side wall layer that is parallel with overlapping panels 1155 and 1160.

Figure 15:
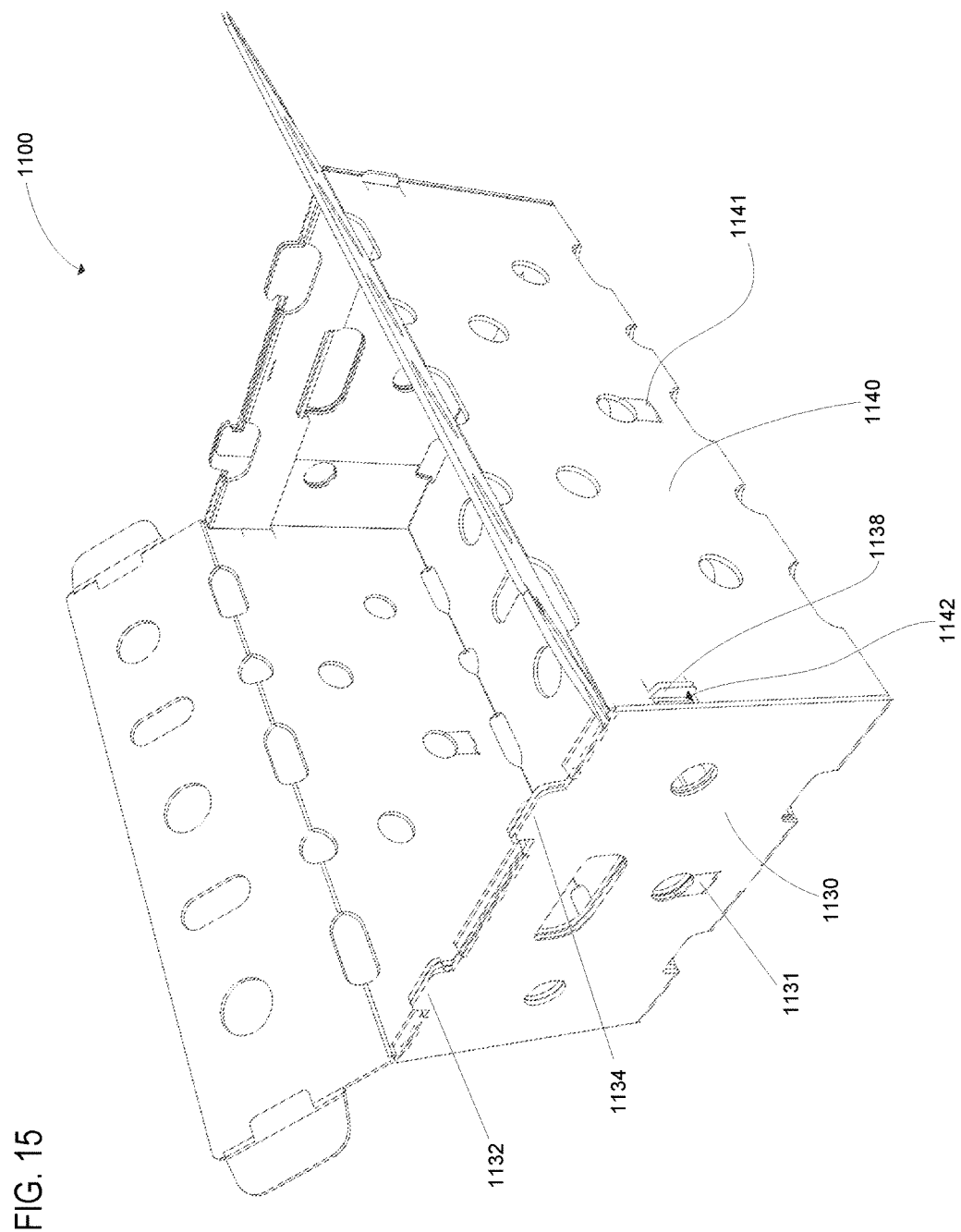
FIG. 15 depicts the sheet of FIG. 11 after the rollover flaps have been folded over inside the resulting container.

FIG. 15 is another perspective view of sheet/container 1100 following further folding steps. In the state of FIG. 15, the opposing rollover flaps have been folded into the interior of the container and the opposing locking tabs on each rollover flap have been inserted into their respective slots. Thus, as illustrated in this figure, locking tab 1138 from rollover flap 1136 has been inserted into slot 1142.

Figure 16:
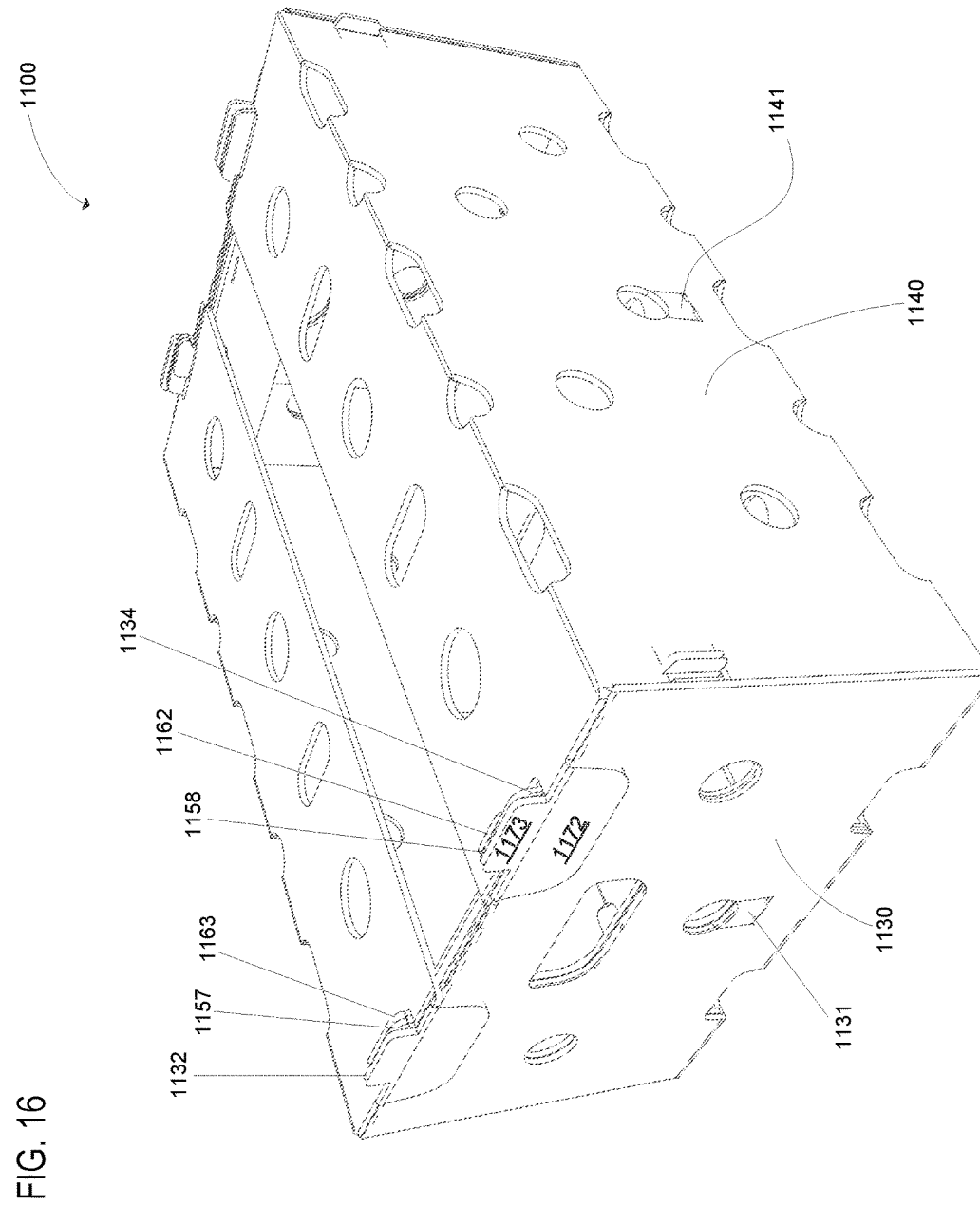
FIG. 16 is a perspective view of the sheet of FIG. 11 following completion of a folding process for folding the sheet into a container.
Figure 17:
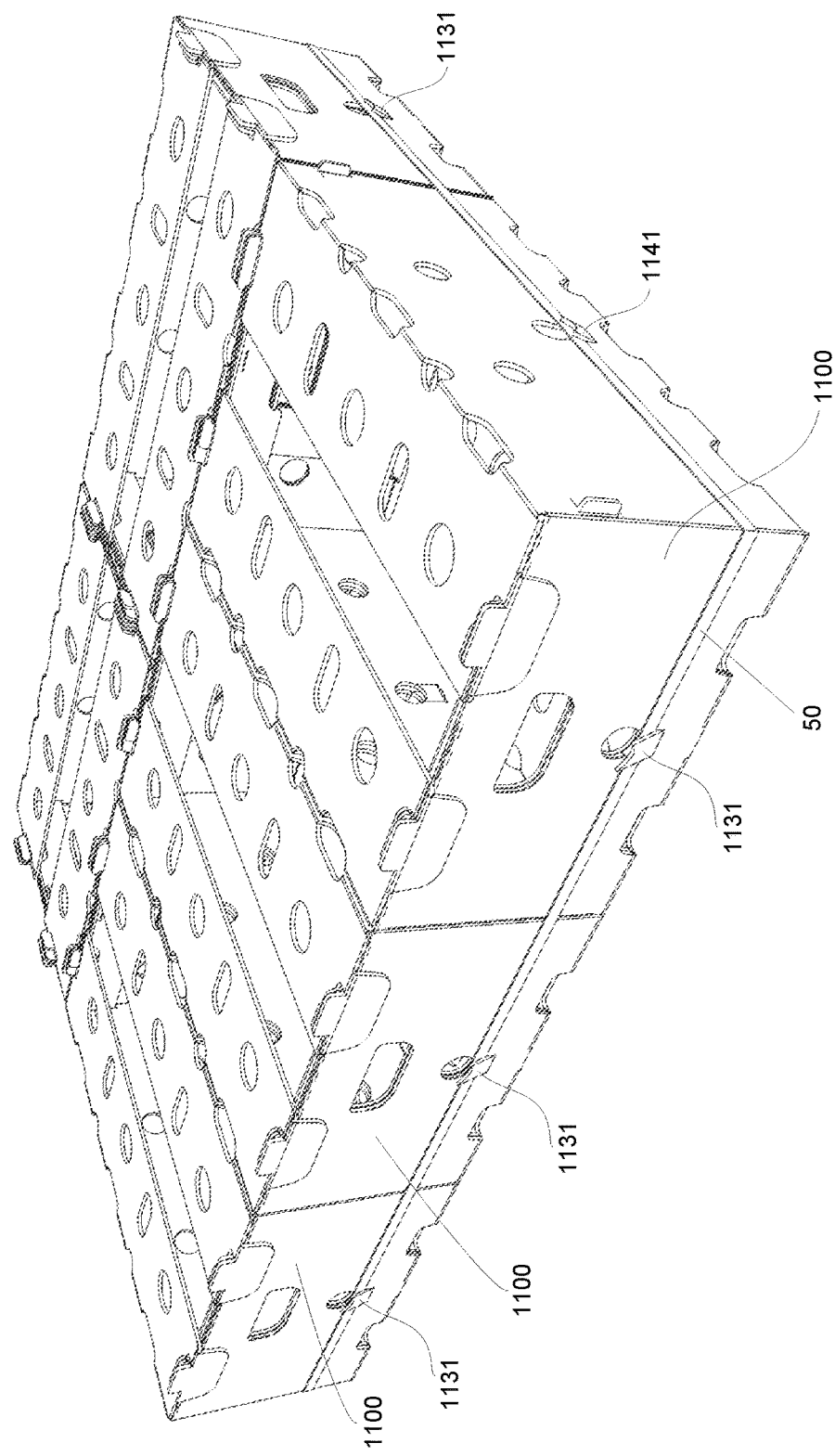
FIG. 17 is a perspective view of a plurality of containers bound together by a strapping band, which strapping band is held in place with a series of strapping flaps of the containers.

FIG. 16 depicts another stage of the folding process. In this figure, both of the two top panels have been folded down to engage locking flaps at opposite ends of both panels, such as locking flap 1172. Thus, locking flap 1172 has been pivoted against panel 1130, and the slot exposed by pivoting door 1173 of locking flap 1172 has been filled by locking tabs 1134, 1158, and 1162. Thus, in the closed lid configuration, door 1173 is positioned parallel to these three locking tabs. The same is true for the other locking flaps and their corresponding locking tabs and slots.

FIG. 17 is a perspective view of a plurality of containers 1100 following completion of the folding process for folding the sheets into containers. As shown in this figure, each of these containers 1100 has been bound together using a strapping band 50. In addition, this figure depicts each of the exposed sides of containers 1100 with their respective strapping flaps pivoted away from the container to define a path for receiving and/or holding band 50 or another strapping material. More particularly, because the depicted strapping flaps each comprises a bendable strapping flap configured to be selectively extended from the container so as to engage a strapping band 50 or other strapping material, the exposed strapping flaps have each been selectively bent away from their respective containers to allow a user to more easily bind together a plurality of containers along a preferred height. Although the strapping flaps depicted in FIG. 17 are each formed immediately adjacent to a respective ventilation opening and so as to partially define a respective ventilation opening, other embodiments are contemplated in which strapping flaps may be formed elsewhere on the containers 1100 as desired, such as, for example, adjacent to a handle opening.

Because the sides of each container 1100 that are not exposed are positioned adjacent a side of an adjacent container 1100, the strapping flaps on these sides may be left in their unfolded/unpivoted configurations. Thus, a series of short side strapping flaps 1131 are shown bent away from the side surfaces of their respective containers 1100 and a long side strapping flap 1141 is shown on an adjacent side of one of the containers 1100. Strapping flaps 1131 and 1141 are examples of means for holding strapping material while tensioning the strapping material for strapping together multiple containers.

Although it is preferred that each side have a corresponding strapping flap so that strapping material may be held by a flap irrespective of the orientations of the adjacent containers, in some embodiments each of at least two opposing sidewalls of the container may comprise means for holding strapping material while tensioning the strapping material for strapping together multiple containers.

It will be understood by those having skill in the art that changes may be made to the details of the above-described embodiments without departing from the underlying principles presented herein. In addition, any suitable combination of various embodiments, or the features thereof, is contemplated.

Any methods disclosed herein may comprise one or more steps or actions for performing the described method. The method steps and/or actions may be interchanged with one another. In other words, unless a specific order of steps or actions is required for proper operation of the embodiment, the order and/or use of specific steps and/or actions may be modified.

Throughout this specification, any reference to "one embodiment," "an embodiment," or "the embodiment" means that a particular feature, structure, or characteristic described in connection with that embodiment is included in at least one embodiment. Thus, the quoted phrases, or variations thereof, as recited throughout this specification are not necessarily all referring to the same embodiment.

Similarly, it should be appreciated that in the above description of embodiments, various features are sometimes grouped together in a single embodiment, figure, or description thereof for the purpose of streamlining the disclosure. This method of disclosure, however, is not to be interpreted as reflecting an intention that any claim require more features than those expressly recited in that claim. Rather, inventive aspects lie in a combination of fewer than all features of any single foregoing disclosed embodiment.

Those having skill in the art will therefore appreciate that many changes may be made to the details of the above-described embodiments without departing from the underlying principles of the invention. The scope of the present invention should, therefore, be determined only by the following claims.

The invention claimed is:

1. A sheet for folding into a container, comprising:
   a first side panel comprising a first locking tab and a rollover flap, wherein the rollover flap is configured to be folded with respect to the first side panel to expose the first locking tab;
   a second side panel configured to be folded with respect to the first side panel during a folding process for folding the sheet into a three-dimensional container such that the second side panel is positioned adjacent and at least substantially parallel to the first side panel;
   a third side panel configured to be folded with respect to the first side panel and the second side panel during the folding process such that the third side panel is positioned adjacent and at least substantially parallel to and overlaps with the second side panel, wherein at least one of the second side panel and the third side panel comprises a bendable tab, and wherein at least one of the second side panel and the third side panel comprises a cutout configured to receive the bendable tab to hold the second side panel in place with respect to the third side panel while the rollover flap is folded with respect to the first side panel to expose the first locking tab; and
   a first top panel comprising a slot for receiving the first locking tab, wherein the first top panel further comprises a first locking flap configured to be folded so as to extend adjacent to an exterior surface of the container at least substantially parallel to the first locking tab to secure the first top panel in a closed position to at least partially enclose the container.

2. The sheet of claim 1, wherein the bendable tab has a shape that at least substantially matches a shape of the cutout.

3. The sheet of claim 2, wherein the bendable tab is slightly larger in size than the cutout.

4. The sheet of claim 2, wherein the bendable tab comprises a trapezoidal shape, and wherein the cutout comprises a trapezoidal shape.

5. The sheet of claim 1, wherein the first locking flap comprises a door, wherein the door is configured to open to expose the slot for receiving the first locking tab upon bending the first locking flap with respect to the second and third side panels.

6. The sheet of claim 5, wherein the sheet is configured such that, upon folding the first top panel with respect to the second and third side panels during the folding process, the first locking tab automatically engages the door to cause the first locking flap to bend and expose the slot.

7. The sheet of claim 1, wherein the first side panel further comprises a clearance aperture, and wherein the first locking tab is positioned to extend within the clearance aperture such that the clearance aperture provides spacing between the first locking tab and the rollover flap.

8. A container, comprising:
   a first side panel defining an outermost surface of a first sidewall of the container;
   a second side panel adjacent to and at least substantially parallel to the first side panel, wherein the second side panel partially defines the first sidewall, and wherein second side panel is positioned interior of the first side panel; and
   a third side panel positioned adjacent and at least substantially parallel to the second side panel, wherein the third side panel partially defines the first sidewall, wherein the third side panel is positioned interior of the second side panel, wherein at least one of the second side panel and the third side panel comprises a bendable tab, and wherein at least one of the second side panel and the third side panel comprises a cutout configured to receive the bendable tab once the bendable tab has been bent and inserted within the cutout to hold at least two side panels defining the first sidewall in place.

9. The container of claim 8, wherein the second side panel and the third side panel each comprises a locking tab, and wherein the respective locking tabs of the second side panel and the third side panel overlap.

10. The container of claim 9, further comprising a first top panel, wherein the first top panel comprises a slot configured to receive both of the respective locking tabs of the second side panel and the third side panel.

11. The container of claim 8, wherein the first sidewall comprises a width extending from a first end of the first sidewall to a second end of the first sidewall, wherein the first side panel extends along the entire width, wherein the second side panel extends from the first end without extending to the second end, and wherein the third side panel extends from the second end without extending to the first end.

12. The container of claim 8, wherein at least one sidewall of the container comprises means for holding strapping material while tensioning the strapping material for strapping together multiple containers.

13. The container of claim 12, wherein each of at least two opposing sidewalls of the container comprises means for holding strapping material while tensioning the strapping material for strapping together multiple containers.

14. The container of claim 13, wherein each of the sidewalls of the container comprises means for holding strapping material while tensioning the strapping material for strapping together multiple containers.

15. The container of claim 12, wherein the means for holding strapping material comprises a bendable strapping flap configured to be selectively extended from the container so as to engage a strapping material.

16. A container, comprising:
a first sidewall;
a second sidewall positioned opposite the first sidewall;
a third sidewall positioned adjacent to the first sidewall and the second sidewall; and
a fourth sidewall positioned opposite the third sidewall, wherein at least one sidewall comprises a strapping flap configured to facilitate tensioning of strapping material for strapping together multiple containers, wherein the strapping flap is configured to be selectively extended away from the container so as to engage a strapping material extending along the at least one sidewall along an inner surface of the strapping flap.

17. The container of claim 16, wherein the container comprises a plurality of ventilation openings.

18. The container of claim 17, wherein the strapping flap is formed so as to partially define at least one of the plurality of ventilation openings extending through at least one of the sidewalls.

19. The container of claim 16, wherein the container comprises at least one strapping flap for each of the sidewalls.

20. The container of claim 19, wherein each of the sidewalls comprises at least one ventilation opening, and wherein each of the strapping flaps is formed so as to partially define a ventilation opening.

21. The container of claim 16, wherein the strapping flap is spaced apart from a top surface of the container in an unbent configuration.

22. The container of claim 16, wherein the strapping flap is configured to receive an elongated strap extending horizontally across the container and at least one adjacent container.

* * * * *